United States Patent
Alrod et al.

(10) Patent No.: US 8,464,134 B2
(45) Date of Patent: Jun. 11, 2013

(54) METHOD AND APPARATUS FOR ERROR CORRECTION ACCORDING TO ERASE COUNTS OF A SOLID-STATE MEMORY

(75) Inventors: Idan Alrod, Herzliya (IL); Eran Sharon, Rishon Lezion (IL); Menahem Lasser, Kochav Yair (IL)

(73) Assignee: SanDisk IL Ltd, Kfar Saba (IL)

( * ) Notice: Subject to any disclaimer, the term of this patent is extended or adjusted under 35 U.S.C. 154(b) by 694 days.

(21) Appl. No.: 12/436,155

(22) Filed: May 6, 2009

(65) Prior Publication Data
US 2009/0319859 A1    Dec. 24, 2009

Related U.S. Application Data

(60) Provisional application No. 61/075,065, filed on Jun. 24, 2008.

(51) Int. Cl.
*G06F 11/00* (2006.01)

(52) U.S. Cl.
USPC .......................................................... 714/773

(58) Field of Classification Search
USPC .................................. 714/773, 752
See application file for complete search history.

(56) References Cited

U.S. PATENT DOCUMENTS

| | | | |
|---|---|---|---|
| 5,341,339 A | 8/1994 | Wells | |
| 5,388,083 A | 2/1995 | Assar et al. | |
| 5,568,423 A | 10/1996 | Jou et al. | |
| 5,712,819 A | 1/1998 | Harari | |
| 5,963,480 A | 10/1999 | Harari | |
| 6,166,650 A * | 12/2000 | Bruwer | 340/5.26 |
| 6,230,233 B1 | 5/2001 | Lofgren et al. | |
| 6,570,790 B1 | 5/2003 | Harari | |
| 6,831,865 B2 | 12/2004 | Chang et al. | |
| 7,900,125 B1 * | 3/2011 | Liu et al. | 714/799 |
| 2004/0083333 A1 * | 4/2004 | Chang et al. | 711/103 |
| 2005/0281113 A1 * | 12/2005 | Yada et al. | 365/222 |
| 2008/0022189 A1 * | 1/2008 | Vityaev et al. | 714/770 |

(Continued)

FOREIGN PATENT DOCUMENTS

| | | |
|---|---|---|
| WO | WO2007/132457 | 11/2007 |
| WO | WO2008/053472 | 5/2008 |
| WO | WO2008/068747 | 6/2008 |

OTHER PUBLICATIONS

U.S. Appl. No. 11/642,708, filed Jun. 2008, Alrod; Idan ; et al.

(Continued)

*Primary Examiner* — Scott Baderman
*Assistant Examiner* — Yair Leibovich
(74) *Attorney, Agent, or Firm* — Martine Penilla Group, LLP

(57) ABSTRACT

Embodiments of the present invention relate to methods and devices where an erase count is maintained for at least one block of solid state memory. Errors are corrected in data read from the solid state memory in accordance with the associated erase count of the memory block. In some embodiments, one or more of the following error-correction operations may be effected according to the associated erase count of a memory block from which the data is read: (i) a decoder and/or decoder mode is selected; (ii) a decision to attempt correcting errors using a lighter-weight weight decoder (mode) and/or heavier weight decoder (mode) and/or faster decoder (mode) and/or slower decoder (mode) is made; (iii) a mode transition and/or error correction attempt resource budget is determined; (iv) a number of soft bits is determined; and (v) a decoding bus width size is selected.

15 Claims, 14 Drawing Sheets

U.S. PATENT DOCUMENTS

| | | |
|---|---|---|
| 2009/0070651 A1* | 3/2009 | Diggs et al. .................... 714/752 |
| 2009/0144598 A1* | 6/2009 | Yoon et al. .................... 714/752 |
| 2009/0150748 A1* | 6/2009 | Egner et al. .................... 714/758 |
| 2009/0164704 A1* | 6/2009 | Kanade et al. ................ 711/103 |
| 2009/0265598 A1* | 10/2009 | Lasser .......................... 714/746 |
| 2009/0319825 A1* | 12/2009 | Yang et al. ....................... 714/5 |
| 2011/0264981 A1* | 10/2011 | Alrod et al. ................... 714/752 |

OTHER PUBLICATIONS

U.S. Appl. No. 11/651,483, filed Oct. 2007, Murin; Mark; et al.

\* cited by examiner

METHOD AND APPARATUS FOR ERROR CORRECTION ACCORDING TO ERASE COUNTS OF A SOLID-STATE MEMORY

CROSS-REFERENCE TO RELATED APPLICATIONS

This patent application claims the benefit of U.S. Provisional Patent Application No. 61/075,065, filed Jun. 24, 2008 by the present inventors

FIELD OF THE INVENTION

The present invention relates to apparatus, methods; and computer medium for correcting errors in data read from a memory such as a flash memory.

BACKGROUND AND RELATED ART

Non-volatile memory is a type of memory that can retain its stored data without a power source. There are several types of non-volatile memories, with different read, write and erase capabilities, access times, data retention, data endurance cycles, etc. Electrically Erasable Programmable Read Only Memory (EEPROM) is capable of performing read write operations on a per-byte level, which means that each of the memory locations can be individually read and written.

Flash memory, comprised of flash-type floating-gate transistors, or cells, is a non-volatile memory similar in functionality and performance to EEPROM memory; flash memory has the advantage of being relatively inexpensive, although it operates under certain limitations. It is not possible to rewrite to a previously written location on flash memory without first erasing an entire memory section, i.e., the flash cells must be erased (e.g. programmed to "one") before they can be programmed again. Flash memory can only erase relatively large groups of cells, usually called erase blocks (for example, 16 KB to 2 MB in size for many current commercial devices it is anticipated that the size of erase blocks will increase in the future, as devices with higher capacity become commercially available).

Error Correction In Flash Memory Devices

One salient feature of flash memory, and other memories (for example magnetic memory, optical storage and volatile memory) as well, is that these memories are corrupting medium one or more errors are sometimes introduced into original data that is written to the memory, so that when the data is read back from the memory, one or more information bits may be read from the memory in a "flipped" state.

In order to overcome this phenomenon and to make NAND-type memories usable by real applications, it is a common technique to use Error Correction Codes (ECC) in conjunction with these memories.

There is an ongoing need for improved techniques and apparatus for handling error correction in flash memory devices, and in storage devices that include solid state memory other than flash memory.

A Discussion of Device Architecture

FIG. 1A (prior art) is a block diagram of a flash memory storage device 260 (prior art). The flash memory storage device includes a flash memory 270 and a flash controller 280 operative to read data and to write data to the flash memory 270. The terms "program", "programming", "programmed", and "programmable" are used herein interchangeably with the terms "write", "writing", "written", and "writable", respectively, to denote the storing of data in a flash memory.

One example of a flash memory storage device is a "peripheral flash storage device." Peripheral flash storage devices are well-known in the art of computing, in form factors such as USB flash drives (UFD); PC-cards; and small storage cards used with digital cameras, music players, handheld and palm-top computers, and cellular telephones.

FIG. 1B (prior art) is a block diagram of a peripheral flash memory storage device 260* (the asterisk indicates that the flash memory storage device is a peripheral flash storage device) that is "coupled with" or configured to exchange data with a host device 310 (for example, a laptop or desktop or handheld computers, digital camera, mobile telephone, music player, and video game consoles) via device-side interface 250. Peripheral flash memory storage device 260* and host device 310 communicate with each other via communications link 300 using host-side interface 350 and device-side interface 250 (for example, respective USB or SD interfaces).

Although the peripheral flash memory storage device 260* is illustrated in the figure as a device that is separate from the host device 310, it is appreciated that, in some implementations, flash memory storage device 260* may be deployed within a housing of host device 310.

In one example, flash memory storage device 260* provides data-reading and data-writing services to host device 310. Data received by flash memory storage device 260* from host device 310 is written to flash memory 270 by flash controller 280. Furthermore, in response to "data read" requests received by flash memory storage, flash controller 280 reads data from flash memory 270.

Errors may be corrected in the read data at "read time" or at any later time. The error-correction may be carried out at least in part by flash controller 280, at least in part by host device 310 (for example, by execution of executable code 340 in RAM 330 by host-side processor 320 or in any other manner), and any other location and in any other manner.

The skilled artisan will appreciate that "peripheral flash storage devices" are not the only class of flash memory storage devices. For example, certain mobile phones, desktop or laptop computers, PDA devices or other electronic devices may also include flash memory and a flash controller, and may not necessarily be configured to couple with a host device and/or provide data reading services and/or data writing service for a host device.

The skilled artisan will appreciate that the flash memory devices described in FIGS. 1A-1B are just one class of peripheral non-volatile storage memory device, and other memory devices may include other types of solid-state memory, such as optical memory and magnetoresistive random-access memory (MRAM).

SUMMARY OF EMBODIMENTS

Various embodiments address these and related issues, examples of which embodiments, including methods and systems, are provided herein.

It is now disclosed for the first time a method for handling error correction, the method comprising a) maintaining an erase count for at least one block of a solid state memory; b) reading data from one of the memory blocks having an associated erase count; c) in accordance with the associated erase count of the memory block, effecting at least one of: i) choosing one of a first decoder and a second decoder; and ii) choosing one of a first decoder mode and a second decoder mode; d) correcting errors in the read data using only the chosen decoder or the chosen mode.

In some embodiments, the solid state memory is a flash memory.

In some embodiments, at least one of the maintaining, the reading, the effecting, and the correcting is carried out by a device controller of a storage device in which the solid state memory resides.

In some embodiments, the storage device is operatively coupled to a host device via an inter-device interface, and wherein the method further comprises: e) sending the error-corrected data from the storage device to the host device.

It is now disclosed for the first time a method for handling error correction, the method comprising a) maintaining an erase count for at least one block of a solid state memory; b) reading data from one of the memory blocks having an associated erase count; c) in accordance with the associated erase count, effecting at least one of: i) deciding whether to: A) attempt to correct errors using a lighter-weight decoder or B) attempt to correct errors using only a heavier-weight decoder that is heavier than the lighter weight decoder; ii) deciding whether to: A) attempt to correct errors using a faster decoder or B) attempt to correct errors using only a slower decoder that is slower than the faster decoder; iii) deciding whether to: A) attempt to correct errors using a slighter-weight mode of a particular decoder or B) attempt to correct errors using only a heavier-weight mode of the particular decoder that is heavier than the lighter weight mode; and iv) deciding whether to: A) attempt to correct errors using a faster mode of a particular decoder or B) attempt to correct errors using only a slower mode of the particular decoder that is slower than the faster mode; and d) in accordance with at least one of the decisions, correcting errors in the read data.

In some embodiments, at least one of the maintaining, the reading, one or more of the decidings, and the correcting is carried out by a device controller of a storage device in which the solid state memory resides.

It is now disclosed for the first time a method for handling error correction, the method comprising: a) maintaining an erase count for at least one block of a solid state memory; b) reading data from one of the memory blocks having an associated erase count; c) in accordance with the associated erase count, determining at least one of: i) a mode transition condition; and ii) an error correction attempt resource budget; d) making a first attempt to correct errors in the read data using a first set of error correction parameters; and e) in the event that the first attempt to correct errors is unsuccessful, making a second attempt to correct errors in the read data using a second set of error correction parameters, the second attempt being contingent upon at least one of: i) a triggering of the mode transition condition by the first attempt; and ii) an exhausting of the resource budget by the first attempt.

In some embodiments, i) the method includes determining the mode transition condition; and ii) the second attempt is contingent upon at least the triggering of the mode transition condition by the first attempt.

In some embodiments, i) the method includes determining the resource budget; and ii) the second attempt is contingent upon at least the exhausting of the resource budget by the first attempt.

In some embodiments, at least one error correction parameter is selected from the group consisting of: i) a selection parameter for selecting a decoder from a plurality of decoders (for example, a parameter describing decoder 'heaviness' or 'decoder speed'); ii) a decoder mode parameter for selecting a decoder mode for a given decoder from a plurality of decoder modes (for example, a parameter describing decoder mode 'heaviness' or decoder mode 'speed'); iii) a bit-probability value for the read data; iv) a number of soft bits; and v) a decoder bus width.

In some embodiments, the mode transition condition is selected from the group consisting of: i) a timeout condition; ii) a number of iterations condition; and iii) a number of CPU cycles condition.

In some embodiments, the error correction attempt resource budget is selected from the group consisting of: i) a time budget; ii) a CPU cycles budget; and iii) an iterations budget.

In some embodiments, at least one of the maintaining, the reading, the determining, and one or more of the attempts is carried out by a device controller of a storage device in which the solid state memory resides.

It is now disclosed for the first time a method for handling error correction, the method comprising: a) maintaining an erase count for at least one block of a memory; b) reading data from one of the memory blocks having an associated erase count; c) in accordance with the associated erase count, effecting at least one of: i) determining a number of soft bits to be read for the data; and ii) selecting a decoding bus width size; and d) in the event that the number of soft bits is determined, reading the number of soft bits for the data; and e) attempting to correct errors in the data using at least one of: i) the selected decoding bus width size; and ii) the read soft bits.

In some embodiments, i) the method includes determining the number of soft bits to be read for the data and reading the number of soft bits for the data; and ii) the attempting includes attempting to correct errors in the data using at least the read soft bits.

In some embodiments, i) the method includes selecting the decoding bus width size; and ii) the attempting includes attempting to correct errors in the data using the selected decoding bus width size.

In some embodiments, at least one of the maintaining, one or more of the readings, the determining, the selecting and the attempting is carried out by a device controller of a storage device in which the solid state memory resides.

It is now disclosed for the first time a data storage device comprising: a) a solid state memory; and b) a device controller operative to: i) maintain an erase count for at least one block of the solid state memory; ii) read data from one of the memory blocks having an associated erase count; iii) in accordance with the associated erase count of the memory block, effect at least one of: A) choosing one of a first decoder and a second decoder; and B) choosing one of a first decoder mode and a second decoder mode; and iv) correct errors in the read data using only the chosen decoder or the chosen mode.

It is not disclosed for the first time a data storage device comprising: a) a solid-state memory; and b) a controller operative to: i) maintain an erase count for at least one block of the solid-state memory; ii) read data from one of the memory blocks having an associated erase count; iii) in accordance with the associated erase count, effect at least one of: A) deciding whether to: I) attempt to correct errors using a lighter-weight decoder or II) attempt to correct errors using only a heavier-weight decoder that is heavier than the lighter weight decoder; B) deciding whether to: I) attempt to correct errors using a faster decoder or II) attempt to correct errors using only a slower decoder that is slower than the faster decoder; C) deciding whether to: I) attempt to correct errors using a lighter-weight mode of a particular decoder or II) attempt to correct errors using only a heavier-weight mode of the particular decoder that is heavier than the lighter weight mode; and D) deciding whether to: I) attempt to correct errors using a faster mode of a particular decoder or II) attempt to correct errors using only a slower mode of the particular decoder that is slower than the faster mode; and iv) in accordance with at least one of the decisions, correct errors in the read data.

It is now disclosed for the first time a data storage device comprising: a) a solid state memory; and b) a device controller operative to: i) maintain an erase count for at least one block of the solid state memory; ii) read data from one of the memory blocks having an associated erase count; iii) in accordance with the associated erase count, determine at least one of: A) a mode transition condition; and B) an error correction attempt resource budget; iv) make a first attempt to correct errors in the read data using a first set of error correction parameters; and v) in the event that the first attempt to correct errors is unsuccessful, make a second attempt to correct errors in the read data using a second set of error correction parameters, the second attempt being contingent upon at least one of: A) a triggering of the mode transition condition by the first attempt; and B) an exhausting of the resource budget by the first attempt.

It is now disclosed for the first time a data storage device comprising: a) a solid state memory; and b) a device controller operative to: i) maintain an erase count for at least one block of the solid-state memory; ii) read data from one of the memory blocks having an associated erase count; iii) in accordance with the associated erase count, effect at least one of: A) determining a number of soft bits to be read for the data; and B) selecting a decoding bus width size; and iv) in the event that the number of soft bits is determined, read the number of soft bits for the data; and v) attempt to correct errors in the data using at least one of: A) the selected decoding bus width size; and B) the read soft bits.

It is noted that features described above as pertaining to certain embodiments may also be included in other embodiments, unless indicated to the contrary herein below.

DETAILED DESCRIPTION OF EMBODIMENTS

Figure 1A:
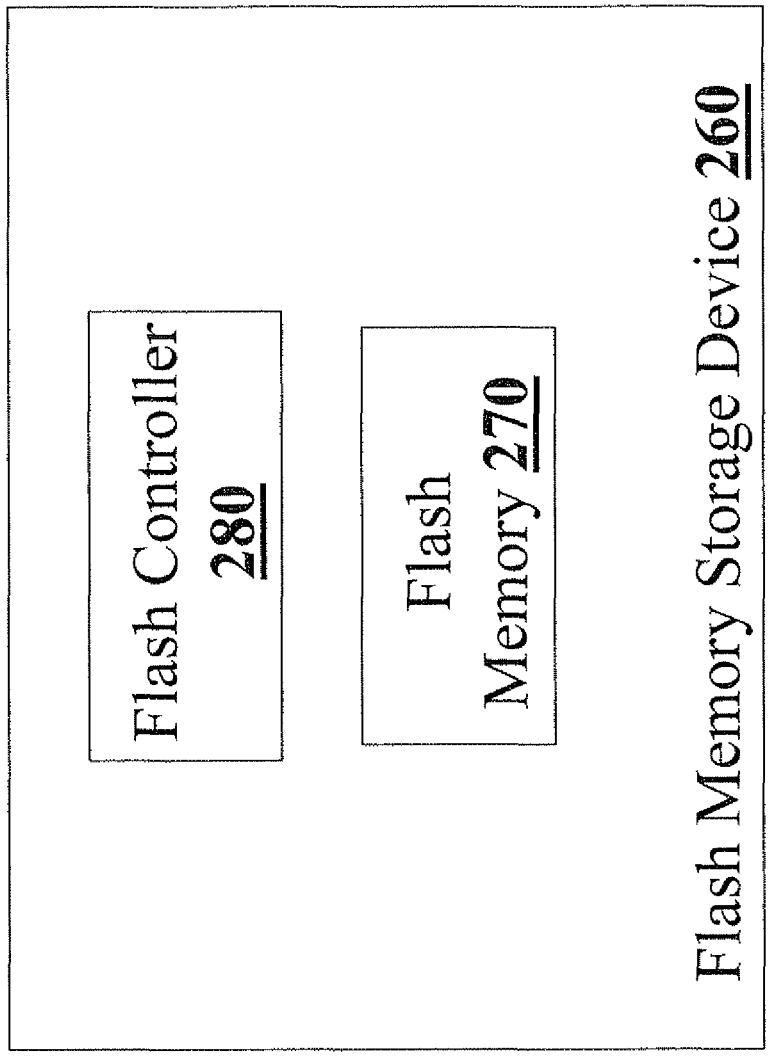
FIG. 1A is a block diagram of a flash memory storage device.
Figure 1B:
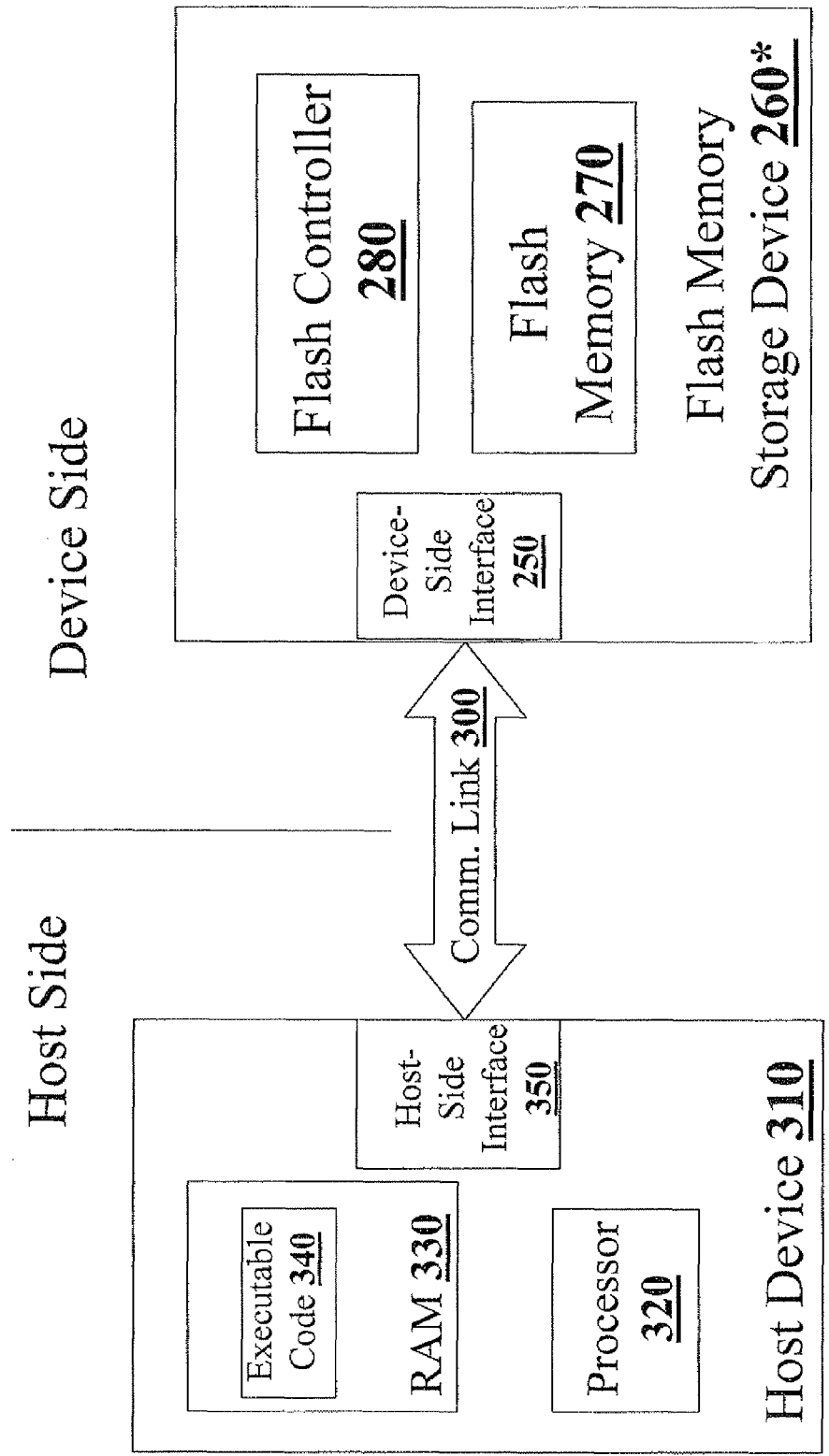
FIG. 1B is a block diagram of a peripheral flash memory storage device that is coupled with a host device.

The claims below will be better understood by referring to the present detailed description of example embodiments with reference to the figures. The description, embodiments and figures are not to be taken as limiting the scope of the claims. It should be understood that not every feature of the presently disclosed methods and apparatuses for handling error correction is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

The present inventors are now disclosing several techniques where ECC decoding for data read from a solid state memory is carried out in accordance with an erase count of a memory block(s) from which the data is read.

Not wishing to be bound by any particular theory, it is noted that when solid-state memory (for example, flash memory, MRAM or any other type of solid-state memory) is erased multiple times, this may degrade the quality of the memory as a storage medium. As such, solid state memory (or a section thereof) from which data has been erased a relatively "large" number of times may be a "poorer" or "less reliable" or "more corrupting" storage medium than solid state memory (or a section thereof) from which data has been erased a relatively "small" number of times.

Several techniques are now described where ECC decoding for data read from a memory is carried out in accordance with an erase count of a block(s) from which the data is read. In the event that the data is read from a block(s) having a "high erase count," this may indicate that the memory block(s) is relatively "less reliable" as a storage medium—as such, data read back from the "less reliable" memory block(s) may include a relatively "large" number of errors. In this case, "pessimistic" techniques appropriate for correcting errors in data having a relatively "large number" of errors may be used. Conversely, in the event that the data is read from a block(s) having a "low erase count", this may indicate that the block(s) are "more reliable" as a storage medium, and that "optimistic" techniques appropriate for correcting errors in data having a relatively "small number" of errors may be used.

A first technique (see the discussion with reference to FIG. 2A) relates to the situation where either a "lighter weight decoder" or a "heavier weight" decoder may be used when correcting errors in data read from one or more memory block(s). In the event that the erase count of the memory block(s) from which the data is read is relatively "high" (indicating that the memory block(s) has been subject to a relatively great deal of "wear-and-tear"), this may be indicative that the "quality" of the memory block(s) from which the data was read is likely to be relatively "low." In this case, the "high" erase count may thus indicate that it is advantageous to employ a more "pessimistic" technique when correcting errors, and to employ the "heavier weight" decoder, even if the heavier weight decoder may be slower and/or require more computational resources (for example, CPU cycles, electrical power, and/or memory resources). Conversely, in the event that the erase count is relatively "low," this may be indicative that the "quality" of the memory block(s) from which the data was read is likely to be relatively "high" and that it may be advantageous to employ the "lighter weight" decoder.

A second technique (see the discussion with reference to FIGS. 3A-3D) relates to "trial-and-error" decoding routines. "Trial-and-error" decoding routines operate as follows: first an attempt is made to correct errors using relatively "lightweight" or "fast" decoder (or decoder mode). In the event that this attempt succeeds, it is possible to "enjoy" a relative fast decoding and/or a decoding that consumes relatively few computational resources. Otherwise, if this attempt fails, a "heavier weight" (or slower) decoder (or decoder mode), which is slower and/or consumes more computational resources, but is less likely to fail correcting errors, is used to correct errors in the data.

In accordance with this second technique, it is now disclosed that if the data is read from a block or blocks having a relatively "high" erase count, a pessimistic approach should be adopted, and it is advantageous to 'pessimistically' skip the step of attempting to decode errors using the lighter weight or faster (but less reliable) decoder (or mode). In this case, this "pessimistic" approach, where no attempt is made to use a lightweight and/or fast decoder that is likely to fail anyhow, may be useful for saving time and/or conserving computational resources. Conversely, if the data is read from a block or blocks having a relatively "low" erase count, then it may be assumed that the lightweight and/or fast decoder is less likely to fail. Thus, in the event that the data is read from a block(s) associated with this 'lower' erase count, it may be advantageous to "take the risk" that the lighter weight and/or faster decoder may fail. Thus, in the event that the data is read from a block(s) associated with this 'lower' erase count, it may be advantageous to attempt decoding the data using the lighter weight and/or faster decoder (or mode) before attempting the 'more reliable' heavier weight and/or slower decoder (or mode).

A third technique (see for example the discussion with reference to FIGS. 4A-4B) also relates to "trial-and-error" decoding routines. According to some embodiments related to this third technique, first an attempt is made to correct errors using a lighter weight decoder and/or faster decoder and/or decoder mode (or decoder) suitable for handling a "smaller" number of errors. If this first attempt fails (for example, if this first attempt does not succeed within a given amount of time, thereby triggering some sort of "timeout" condition), a second attempt is made to correct errors using a heavier weight and/or a slower decoder and/or a mode (or decoder) suitable for handling a "larger" number of errors.

It is now disclosed that in the event that data (i.e. for which it is desired to correct errors) is read from a block(s) of solid state memory having a "high" erase count, then it may be advantageous to carry out the step of attempting to decode errors using the lighter weight or faster (but less reliable) decoder (or mode) only in a "pessimistic" manner—i.e. by investing relatively "few" resources. Thus, in one example, if the attempt to correct errors using the 'lighter weight' or 'faster decoder' does not succeed relatively "quickly" (within a "small timeout value"), then (i) this attempt this abandoned (i.e. considered a 'failure') relatively 'quickly' and (ii) a 'new' attempt to correct errors is then carried out using a different decoder and/or decoder mode which is slower and/or heavier weight and/or more suitable for handling 'larger' number of errors.

Conversely, in the event that data to be corrected is read from a block(s) of solid state memory having a "high" erase count, then it may be advantageous to carry out the step of attempting to decode errors using the lighter weight or faster (but less reliable) decoder (or mode) in a more "optimistic" manner—i.e. by investing "more" resources in the lightweight and/or faster decoder (or decoding mode). Thus, in one example, if the attempt to correct errors using the 'lighter weight' or 'faster decoder' does not succeed relatively "quickly," it may still be assumed that there is, nevertheless, some likelihood that this attempt will eventually succeed. Thus, in this example, before "moving on" to an attempt to correct errors with a decoder or mode that is 'heavier weight' and/or 'slower,' the initial attempt to correct errors with the decoder or mode that is 'heavier weight' and/or 'slower' is "given a chance"—for example, is allowed to work for a longer period of time (or with more CPU cycles) before being designated as a failure.

A fourth technique relates (see for example, the discussion with reference to FIGS. 5A-5B) to deciding on the number of soft bits to be read for correcting errors. The use of soft bits for improving error correction capability in memories is discussed in U.S. patent application Ser. Nos. 11/642,708 and 11/651,483 each of which is incorporated herein by reference in its entirety. As reading soft bits incurs a cost in time and power, there are many situations where the ECC decoder first attempts to decode the data without reading soft bits at all (or with reading only a "low" number of soft bits). If that fails, one or more soft bit(s) may be read and another decoding attempt may be made. If this second attempt also fails, more soft bit(s) are read and another decoding attempt is made. This process may continue to iterate until either the decoding succeeds or we reach the maximal number of available soft bits.

It is now disclosed that a decision about how many soft bits are to be read and used for the initial attempt (see for example step S419 of FIG. 5A) and/or a decision about how many additional soft bits are to be read after an initial attempt fails (see, for example, step S473 of FIG. 5B) may be made in accordance with an erase count of a memory block(s) from which the data is read.

Thus, in the event that this erase count is relatively "high," a "pessimistic" approach may be adopted, and iterations using zero or a "small" number of soft bits may be skipped (or after failure, a relative 'large' number of soft bits may be read) on the assumption that these iterations are not likely to succeed (i.e. because the data is likely to contain a lot of errors, and thus a larger number of soft bits are likely to be required to correct errors in the 'noisy' data).

Conversely, in the event that this erase count (i.e. the erase count of the block(s) of memory from which data is read) is relatively "low," an "optimistic" approach may be adopted, and it may be advantageous in this situation to attempt to correct errors using zero or a "small" number of soft bits on the assumption that it is likely that the data is of a relatively 'high' quality, and that using no soft bits or a relatively 'small' number of soft bits has a reasonable chance of success.

A fifth technique (see, for example, FIG. 6A) relates to a width of a decoder bus. It is note disclosed that in the event that data is read from a memory block(s) with a relatively "high." erase count, this indicates that the data may be of a low quality, and a relatively "pessimistic" approach to correcting errors may be preferred. Thus, it may be advantageous to correct errors using a larger decoder bus in this situation, even though the larger decoder bus may be slower and/or require more computational resources.

Conversely, in the event that data is read from a memory block(s) with a relatively "low" erase count, this indicates that the data may be of a high quality, and a relatively "optimistic" approach to correcting errors, which attempts to correct errors with a smaller decoder bus, may be preferred.

Throughout the present disclosure, when certain teachings are explained in terms of "flash memory," it is appreciated that these teachings may also be applicable to other solid states memories other than flash memory—for example, optical memory or MRAM.

The skilled artisan will appreciate that presently-disclosed techniques for correcting errors may be combined with any other technique for correcting errors in data read from memory.

Before describing the drawings, a general overview of using FCC in flash memories is presented, and definitions of various terms are provided (in the next two sections).

Error Correction in Flash Memory Devices

A general overview of using ECC in flash memories is presented below and includes the following steps:

(1) Before writing data to the memory, an ECC algorithm is applied to the data in order to compute additional (i.e. redundant) bits, which are later used for error detection and correction. These redundant bits are often called "parity bits" or "parity". A combination of the data input into an ECC module and the parity output by that module is called a codeword. Each different value of input data to an ECC module results in a different codeword.

(2) The entire codeword (i.e., the original data and the parity) is recorded to the flash memory. It should be noted, that the actual size of NAND-type flash memory is larger than the size of the original data, and the memory is designed to accommodate parity as well.

(3) When the data are retrieved from the memory, the entire codeword is read again, and an ECC algorithm is applied to the data and the parity in order to detect and correct possible "bit flips" (i.e., errors).

It should be noted that the implementation of ECC may be done by hardware, software, or a combination of hardware and software. Furthermore, ECC may be implemented within a memory device, within a memory device controller, within a host computer, or may be "distributed" among these components of a system.

The algorithms in common use include Reed-Solomon, BCH, Hamming, and many others. Each ECC algorithm is composed of two parts—the part that receives the data bits and generates the parity bits (or equivalently, generates the codeword), and the part that receives the codeword and generates the corrected data bits. The first part is called the "encoder" and is used during writing, and the second part is called the "decoder" and is used, during reading. Each of the two parts may be implemented in either hardware or software, and it is also possible to have one part implemented in hardware while the other part implemented in software. It also is possible for each of the parts to be implemented in a combination of hardware and software.

Receiving the data bits and generating the corresponding codeword is termed "encoding." Receiving the codeword and generating the corrected data bits is termed "decoding."

It should be noted that there actually are two kinds of ECC. The kind of ECC described above, in which the identity of the data bits is preserved in the codeword, is called "systematic" ECC. In "nonsystematic" ECC, the data bits are converted to a codeword in which the identity of the original data bits is not preserved.

Selecting an algorithm, like BCH, as the ECC algorithm to be used in a flash memory system, does not uniquely define the selected solution. Any such ECC algorithm is actually not a single algorithm but a family of algorithms. The algorithms within the same family differ among themselves in the amount of data bits they are able to protect. An algorithm that needs to protect 100 data bits is not identical to an algorithm that needs to protect 10,000 data bits, even though the two algorithms are typically quite similar and operate on the same principles.

But even two algorithms of the same family that both protect the same number of data bits are not necessarily identical. The algorithms may differ in the level of reliability provided, or equivalently—in the number of bit errors in the data that the algorithms are able to correct. For example, one system may require the protection of chunks of 1,000 data bits against any combination of up to 3 bit errors (but not against the occurrence of 4 or more bit errors), while in another system a much higher reliability is desired and therefore it is required to protect chunks of 1,000 data bits against any combination of up to 10 bit errors. Typically, protecting against more errors requires the use of more parity bits (or longer codewords), making the ECC scheme less "efficient", where efficiency is measured by the ratio of the number of data bits in a codeword to the total number of bits in the codeword (including, in systematic ECC, both data bits and parity bits). This measure is typically called the "rate" of the ECC coding.

Different FCC algorithms and implementations also differ in other aspects—speed of the encoding process, speed of the decoding process, complexity of the encoding process, complexity of the decoding process, acceptable error rate in the input to the decoder (defined according to the quality of the storage cells), and more. The complexity of encoding and decoding is important not only because it affects the speed of the operation, but also because it affects the power consumption and silicon area of hardware implementations of the ECC scheme.

It is thus evident that the selection of an ECC solution for a memory system involves a complex trade-off between multiple considerations. Some non-limiting rules-of-thumb typical in the art of ECC designs are:

a. For a given memory reliability, the better the output reliability (or equivalently the higher the number of correctable errors) the lower the rate of the code (or equivalently, for systematic ECC, the more parity bits are required)

b. For a given memory reliability, the better the output reliability, the more complex is the decoder.

c. For a given level of output reliability, the higher the rate of the code, the more complex is the decoder.

d. For a given level of output reliability, the higher the rate of the code, the slower is the decoding.

When designing an ECC solution, one typically starts from the error rate at the decoder's input (dictated by the quality of the storage cells) and the desired output reliability (dictated by the application's requirements). Based on these numbers one typically selects a specific ECC family, calculates the required number of parity bits, and then estimates the speed and complexity of the encoder and decoder.

In some cases the most important consideration for the system's designer is the speed of the decoding, as this may put a limit on the speed of reading the data out from the memory. In such cases the designer may encounter a dilemma—the ECC scheme required for meeting the output reliability requirements may turn out to result in a quite complex decoder with slow operation, not satisfying the speed target of the system. But, on the other hand, selecting an ECC scheme that is relatively simple, and that results in fast decoding, does not provide the required output reliability level.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Because certain types of solid state memory (for example, flash memory, optical storage, or MRAM) are "corrupting medium," one or more errors are sometimes introduced into "original" data that is written to the memory, so that when the data (i.e. a representation of the original data) is read back from the memory, one or more information bits are "flipped."

Embodiments of the present invention relate to an "erase count" for a "memory block." A memory "block" is the smallest "chunk" or amount of memory for erasing. In one example related to flash memory, the block includes some number of flash cells, for example, at least tens or hundreds or thousands or more flash cells. For other types of memory, for example, RAM, the "block" may be a single memory cell, or some plurality of memory cells.

An "erase count" for a given block of memory is a counter indicating how many times the block of solid state memory has been erased so far. Whenever the block of memory is erased, this erase count may be incremented. As noted early, if a block has a relatively "large" erase count, this may indicate that the block is a relatively "poor" storage medium prone to errors.

Embodiments of the present invention relate to "maintaining an erase count for at least one block of the flash memory." The erase count can be maintained either on the host side and/or on the device side, and may be stored in any combination of volatile (for example, RAM or registers) and/or non-volatile memory (for example, flash memory). In one example, the erase count is stored on a die of the controller. In another example, the erase count is stored in one of the flash dies. The erase count may be stored in a single location and/or distributed among multiple locations. In one non-limiting example, the erase count may stored in a data structure used for implementing wear leveling among flash blocks.

In some non-limiting examples (but not all embodiments), whenever a solid-state memory is written to, the solid-state memory must first be erased as part of the writing process. In such systems, the "erase count" may describe, at least in part, a number of times that a given block has been written to.

Any technique for maintaining the erase count may be used, including but not limited to techniques disclosed in U.S. Pat. No. 6,230,233 to Lofgren et al. U.S. Pat. No. 5,341,339 to Wells U.S. Pat. No. 5,568,423 to Jou et al. U.S. Pat. No. 5,388,083 to Assar et al. U.S. Pat. No. 5,712,819 to Harari U.S. Pat. No. 6,570,790 to Harari U.S. Pat. No. 5,963,480 to Harari U.S. Pat. No. 6,831,865 to Chang et al. each of which is incorporated by reference in its entirety.

The process of reconstructing the original, error-free data from the data read back from the memory is "correcting errors," Although the term "correcting errors" is used in the plural, it is appreciated that "correcting errors" also refers to correcting a single error. It is appreciated that in some embodiments, the "correcting" of errors may also include one or more failed attempts to correct errors.

As noted earlier, in order to correct errors, a "decoder" may be used, in order to recover the original data from a representation of a codeword. Some embodiments involve multiple decoders, including "lighter weight" decoders and "heavier weight decoders."

The terms "heavier weight" and "lighter weight" are used to compare two decoders and/or two modes of a single decoder. The "heavier weight" decoder (or heavier weight mode of a single decoder) either (i) consumes more electrical current than the "lighter weight" counterpart and/or (ii) requires more memory (either for computer-executable code of the decoder itself and/or more memory for storing "intermediate results" of calculations when correcting errors) than the "lighter weight" counterpart and/or (iii) requires more computational operations than the "lighter weight" counterpart.

Some embodiments relate to determining a number of "soft bits" to be read and/or used in error correction in accordance with an erase count of memory block(s) from which data is read. A "soft bit" is an estimate of the value of a bit combined with a reliability measure of the estimate. Often, the same number serves as both the estimate of the value of the bit and the reliability measure. For example, the sign of a log-likelihood-ratio (LLR) is an estimate of the value of the bit represented by the LLR and the magnitude of a LLR is a measure of the reliability of that estimate.

In some embodiments, the "soft bit" may be computed and/or determined by reading from the memory using "higher resolutions" than the resolution in which data was written into the cell. The additional bits read using the "higher resolution" may give some sort of indication of the "reliability" of any estimate of a value of a bit of data. In one example, data may be written to memory using different "reference voltages" demarking the boundaries of voltage band, and soft bits may be generated by reading back the data using reference voltages that lie within voltage bands; or "fractional reference voltages." The skilled artisan is referred, for example, to U.S. Pat. No. 7,023,735 of Ban, incorporated herein by reference in its entirety. When data is corrected in accordance with one or more soft bits, this may be useful for improving the error correction routine—however, there is a cost in time and/or computational resources associated with determining the soft bit(s).

Preliminary Discussion: Maintaining an Erase Count and Reading Data from a Solid State Memory (Discussion of Steps S411 and S423 of FIGS. 2A-2B, 3A-3D, 4A-4B, 5A-5B, 6A-6D)

In step S411, an erase count is maintained for at least one memory block. As noted earlier, the erase count may be maintained in any location and/or in any manner. In one non-limiting example, the erase count is maintained by flash controller 280. In one non-limiting example, the erase count is maintained in a data structure (for example, stored in non-volatile memory—for example, a data structure that is also used for the purpose of wear leveling.

In step S423, data is read back from one or more of the memory block(s). The erase count of one or more of the memory block(s) from which data is read may be determined—for example, by effecting a "look-up" in the appropriate data structure.

A Discussion of FIGS. 2A-2B, 3A-3D

Consider two decoders (or one decoder capable of operating in two different modes) with the following characteristics:

a. The first decoder (or decoder mode) is faster and/or is "lighter weight", but on the other hand is not guaranteed to succeed in producing the result of the decoding process.

b. The second decoder (or decoder mode) is slower and/or is "heavier weight", but is guaranteed to always produce the correct result of the decoding process (or at least is more likely to produce the correct result of the decoding process).

Typically, the higher the number of errors in the data, the more frequently the first decoder fails. Unfortunately, upon reading back data from the memory, it is not always known a-priori how many errors are in the read-back data. Thus, it is not always known whether or not a "heavier weight" decoder (or heavier weight mode of a single decoder) is required, or a "lighter weight" decoder will suffice.

The present inventors are now disclosing that in the event that the number of erase counts of the memory block(s) from which the data is read is relatively "low," this may indicate that the read-back data is likely to be of a good "quality," and a relatively "optimistic" technique for correcting errors may be selected for correcting errors in the data read in steps S615 or S625. Thus, in this case, it may be advantageous to "risk" correcting errors using the "lighter weight" decoder (or lighter weight mode of a single decoder). Otherwise, it may be preferable to correct errors using the "heavier weight" decoder or heavier weight mode of a single decoder.

Figure 2A:
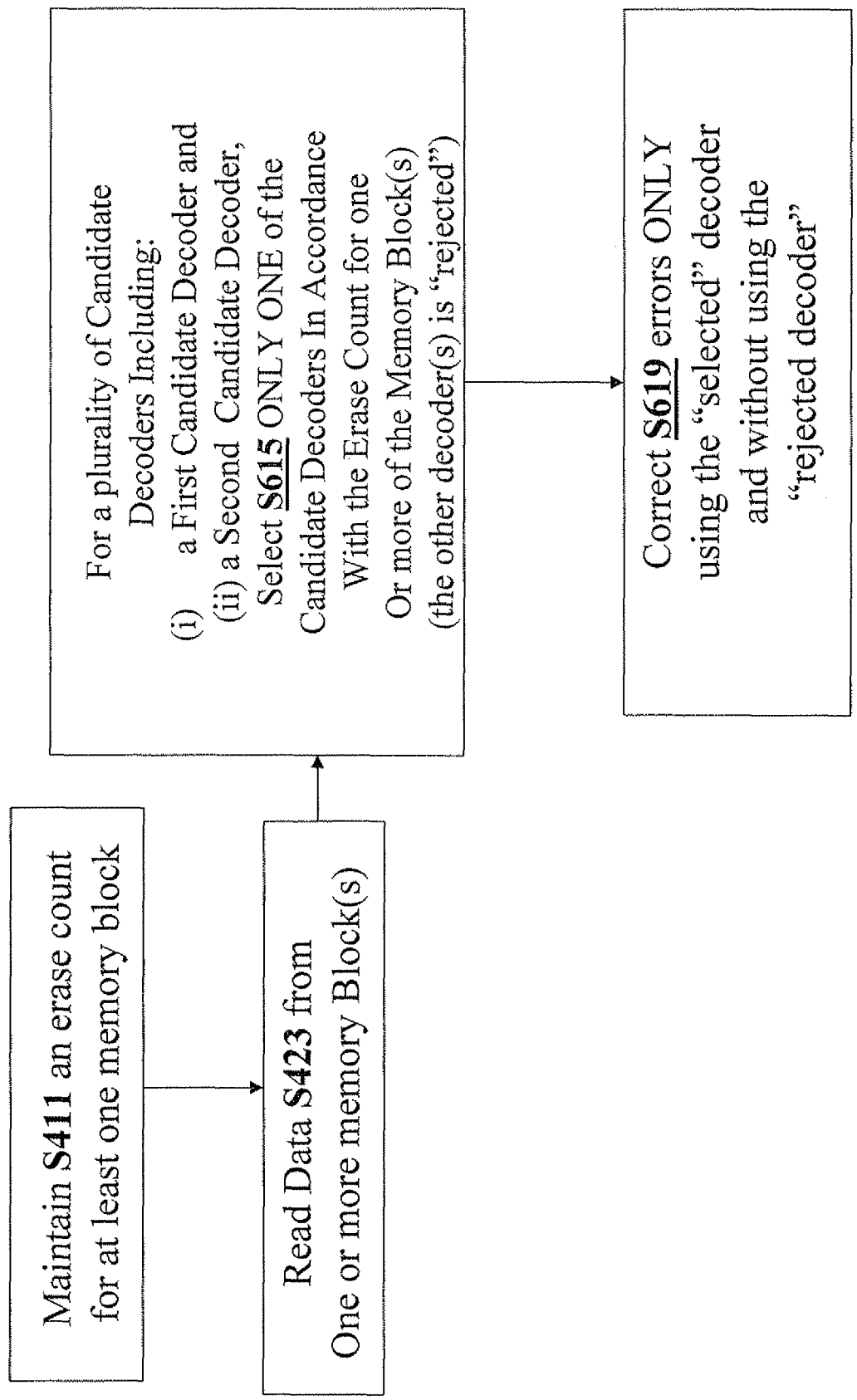
FIG. 2A is a flow chart of a routine for correcting errors using a decoder selected according to an erase count of one or more memory blocks.

Reference is now made to FIG. 2A. In step S615, a decoder is selected from a plurality of candidate decoders in accordance with the erase count of the block(s) from where data is read.

In step S619, errors are corrected only using the selected decoder and without using the unselected "rejected" decoder.

Figure 2B:
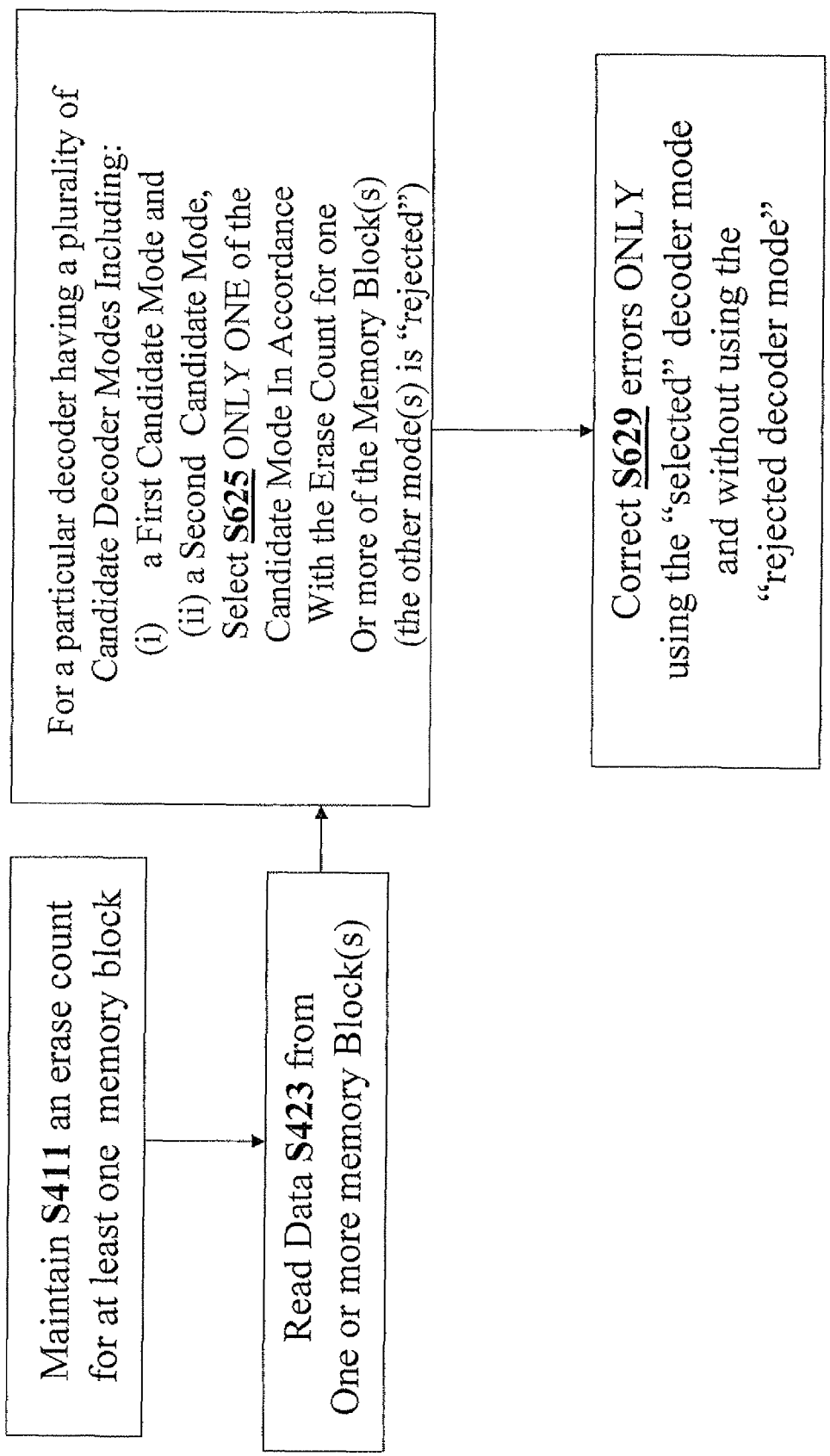
FIG. 2B is a flow chart of a routine for correcting errors using a decoder mode selected according to an erase count of one or more memory blocks.

Reference is now made to FIG. 2B. In step S625, a mode of a given decoder is selected from a plurality of candidate decoder modes in accordance with the erase count of the block(s) from where data is read.

In step S629, errors are corrected only using the selected decoder mode and without using the unselected "rejected" decoder mode.

Figure 3A:
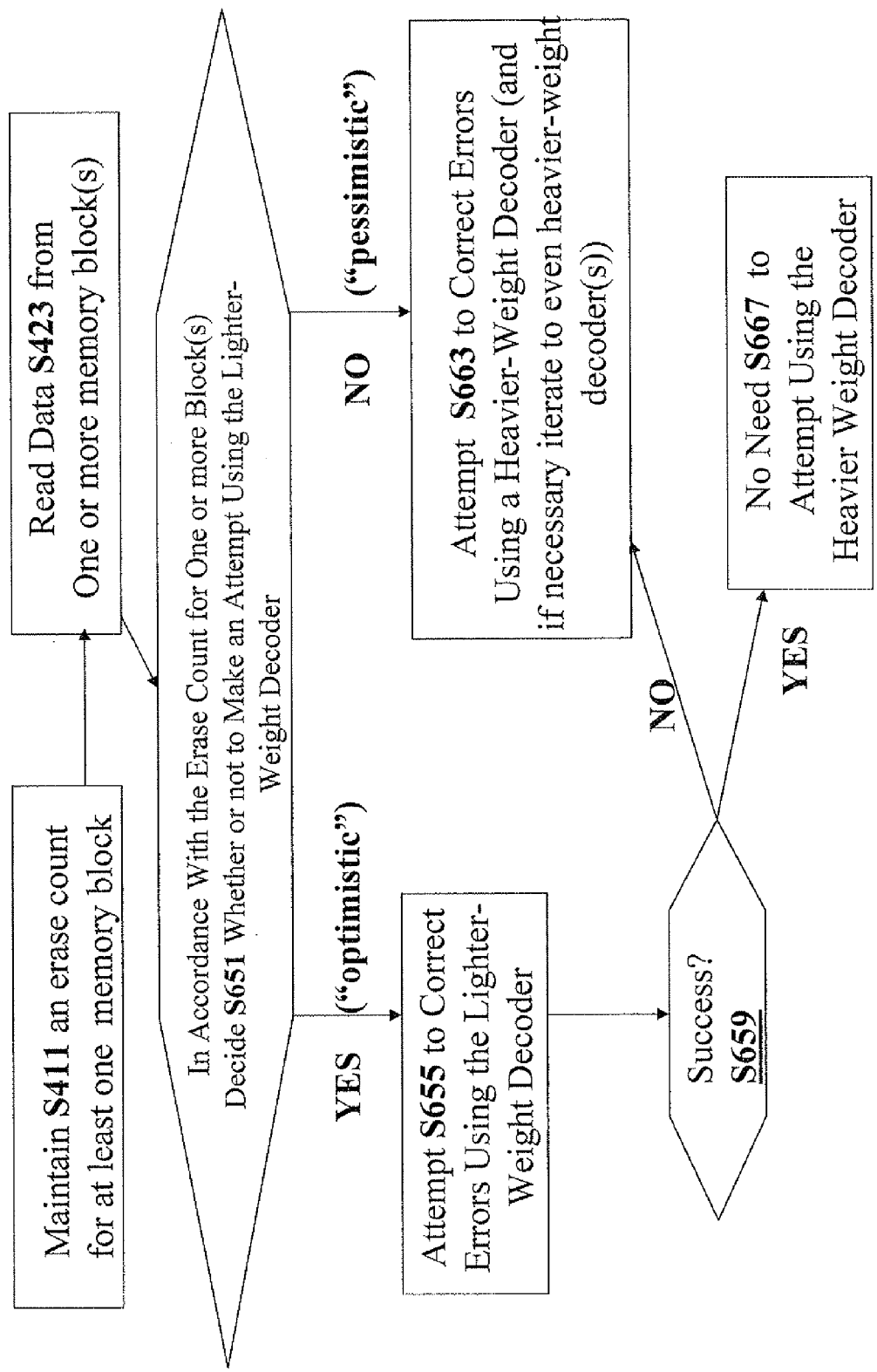
FIG. 3A is a flow chart of a routine for error correction where, contingent upon an erase count for one or more memory blocks, an attempt to correct errors using a lighter-weight decoder is made.

Reference is now made to FIG. 3A.

In step S651, a decision is made whether or not to attempt to correct errors using a lighter-weight decoder (i.e. of a plurality of candidate decoders) according the erase count of the block(s) from where data is read.

In the event that the erase count of the block(s) of solid state memory from where data is read is relatively "low," this may indicate that the read-back data is likely to be of a good "quality," and a relatively "optimistic" error correction strategy may be adopted. Thus, in this scenario, an attempt is made in step S655 to correct errors using the lighter-weight decoder. If the lighter-weight decoder succeeds (see step S659) there is no need to attempt to correct errors using the heavier weight decoder (see step S667). If the lighter-weight decoder fails to correct errors, an attempt is then made S663 to correct errors using a heavier-weight decoder.

Furthermore, it is noted, with reference to step S651, that in the event that the erase count of the block(s) from where data is read is relatively "high," this may indicate that the read-back data is likely to be of a "poor" quality, and a relatively "pessimistic" error correction strategy may be adopted. In this scenario, it is possible to skip step S665, and to attempt to correct errors (in step S663) using the heavier weight decoder rather than the lighter weight decoder.

Figure 3B:
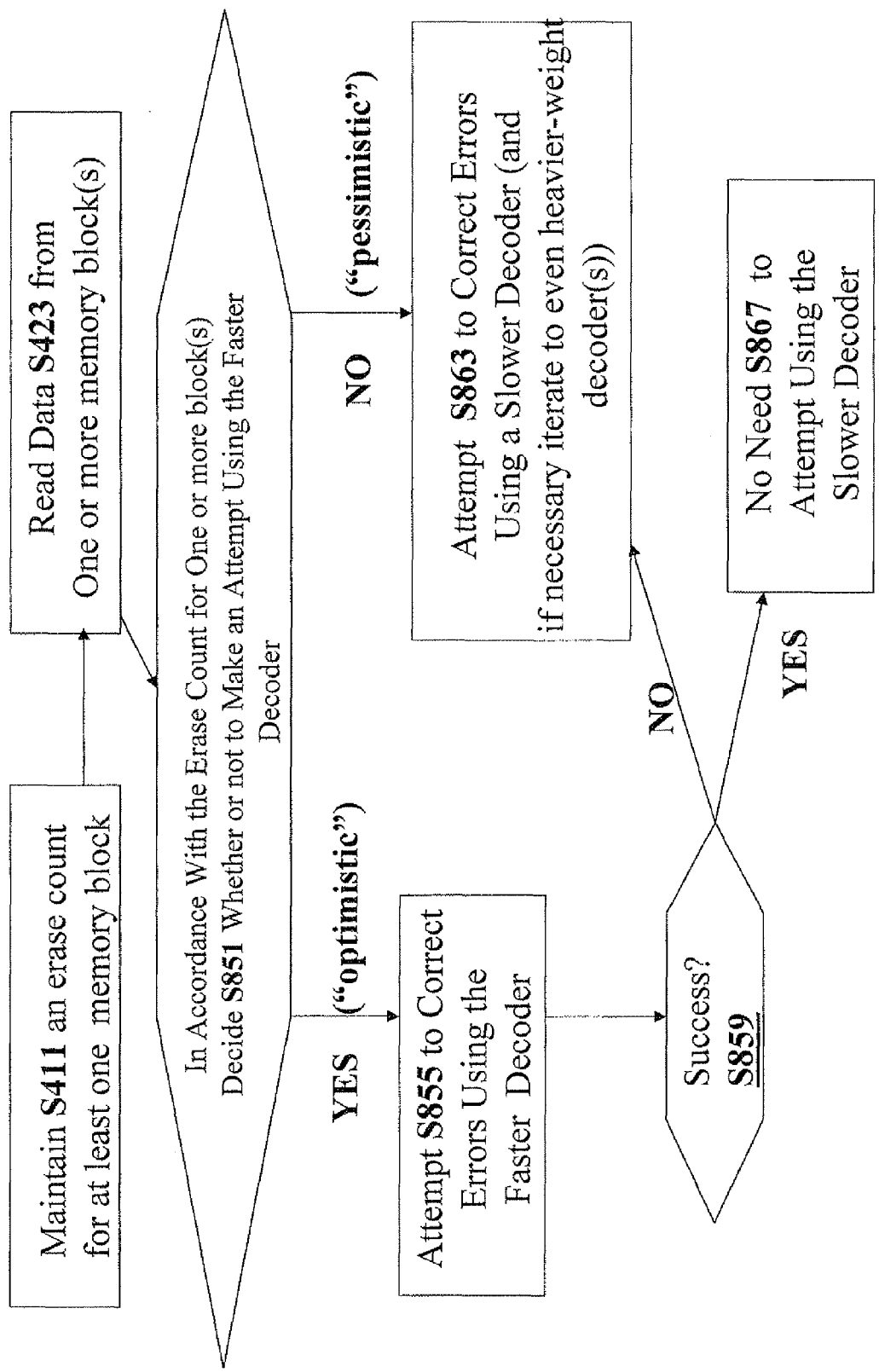
FIG. 3B is a flow chart of a routine for error correction where, contingent upon an erase count for one or more memory blocks, an attempt to correct errors using a faster decoder is made.

Reference is now made to FIG. 3B.

In step S851, a decision is made whether or not to attempt to correct errors using a faster decoder (i.e. of a plurality of candidate decoders) in accordance with an erase count.

In the event that the erase count is "low" and a relatively "optimistic" error correction strategy is adopted, an attempt may be made in step S855 to correct errors using the faster decoder. If the faster decoder succeeds (see step S859) there is no need to attempt to correct errors using the slower decoder (see step S867). If the faster decoder fails to correct errors, an attempt is then made S863 to correct errors using a slower decoder.

Furthermore, it is noted, with reference to step S851, the erase count is "high" and a relatively "pessimistic" error correction strategy is adopted, that it is possible to skip step S865, and to attempt to correct errors (in step S863) using the slower decoder rather than the faster decoder.

Figure 3C:
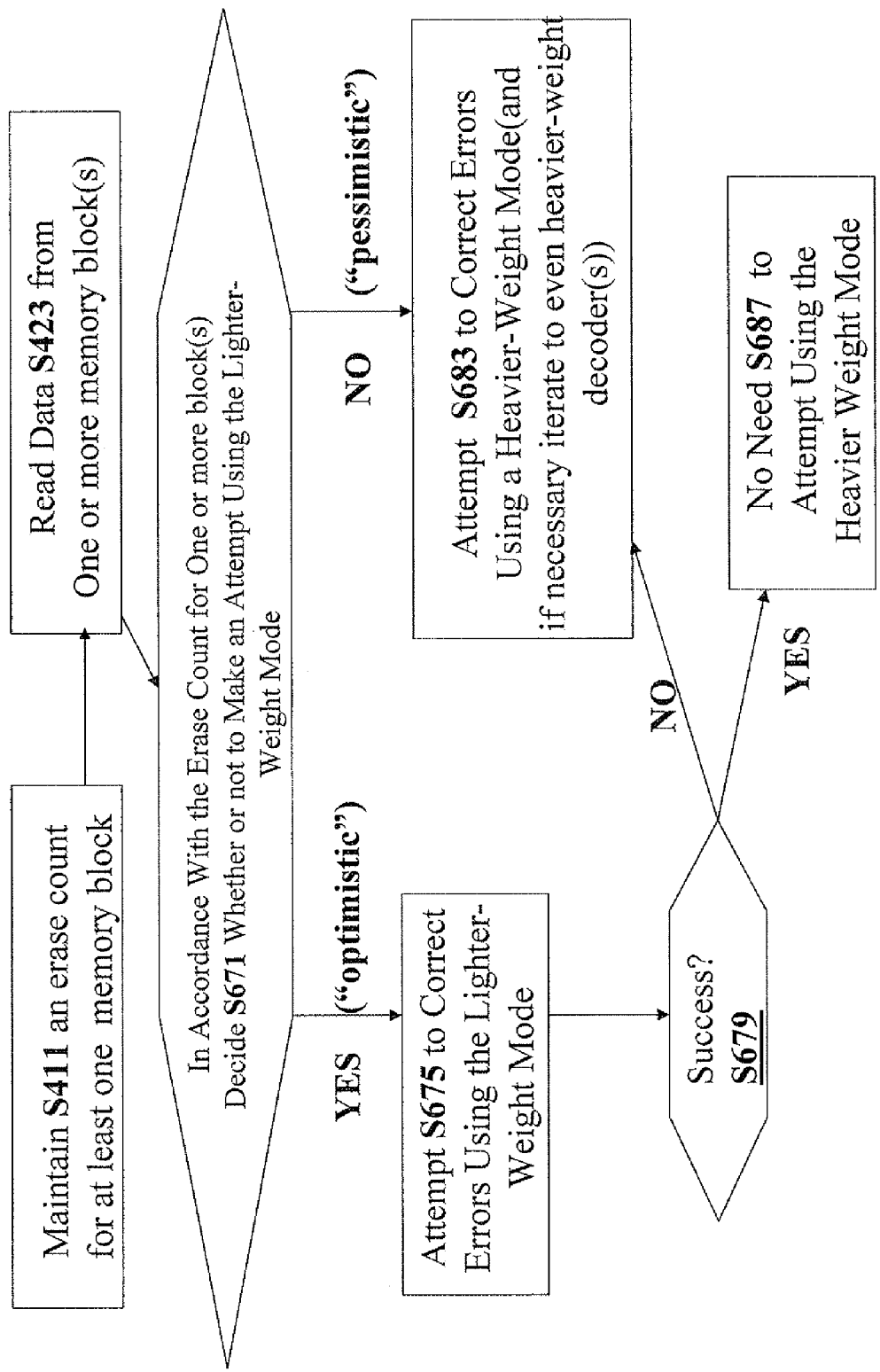
FIG. 3C is a flow chart of a routine for error correction where, contingent upon an erase count for one or more memory blocks, an attempt to correct errors using a lighter-weight decoder mode is made.

Reference is now made to FIG. 3C.

In step S671, a decision is made whether or not to attempt to correct errors using a lighter-weight mode (i.e. of a plurality of candidate decoder modes for a given decoder) in accordance with the erase count of the block(s).

In the event that the erase count is "low" and a relatively "optimistic" error correction strategy is adopted, an attempt may be made in step S675 to correct errors using the lighter-weight mode. If the lighter-weight mode succeeds (see step S679) there is no need to attempt to correct errors using the heavier weight mode (see step S687). If the lighter-weight mode fails to correct errors, an attempt is then made S683 to correct errors using a heavier-weight mode.

Furthermore, it is noted, with reference to step S671, that in the event in the event that the erase count is. "high" and a relatively "pessimistic" error correction strategy is adopted, that it is possible to skip step S675, and to attempt to correct errors (in step S683) using the heavier weight mode rather than the lighter weight mode.

Figure 3D:
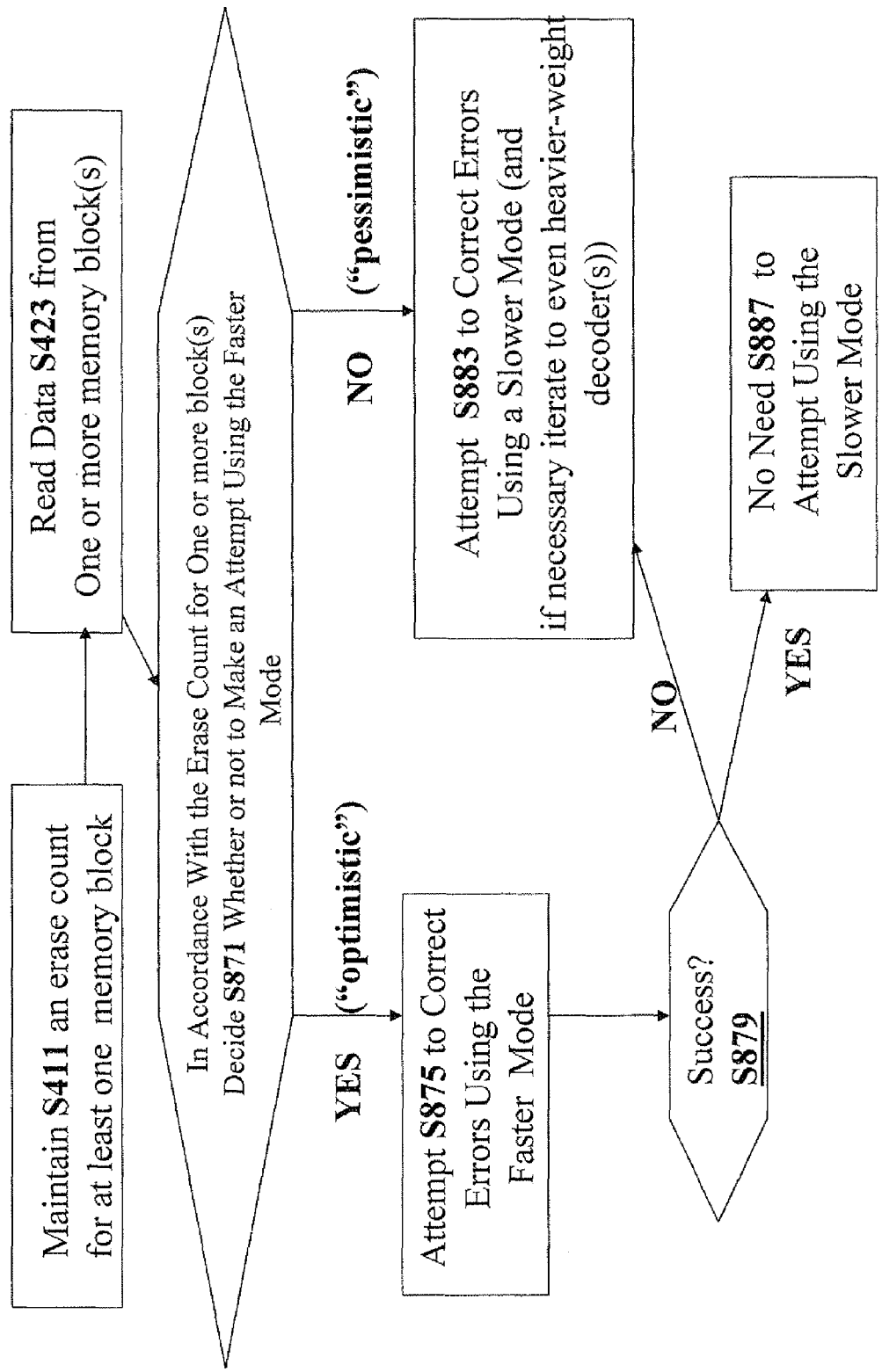
FIG. 3D is a flow chart of a routine for error correction where, contingent upon an erase count for one or more memory blocks, an attempt to correct errors using a faster decoder mode is made.

Reference is now made to FIG. 3D.

In step S871, a decision is made whether or not to attempt to correct errors using a faster decoder mode (i.e. of a plurality of candidate decoder modes) in accordance with results the erase count of the memory block(s).

In the event that the erase count is "low" and a relatively "optimistic" error correction strategy is adopted, an attempt may be made in step S875 to correct errors using the faster decoder mode. If the faster decoder succeeds mode (see step S879) there is no need to attempt to correct errors using the slower decoder mode (see step S887). If the faster decoder mode fails to correct errors, an attempt is then made S883 to correct errors using a slower decoder mode.

Furthermore, it is noted, with reference to step S871, that in the event that the erase count is "high" and a relatively "pessimistic" error correction strategy is adopted, it may be preferable to skip step S865, and to attempt to correct errors (in step S863) using the slower decoder mode rather than the faster decoder mode.

Figure 4A:
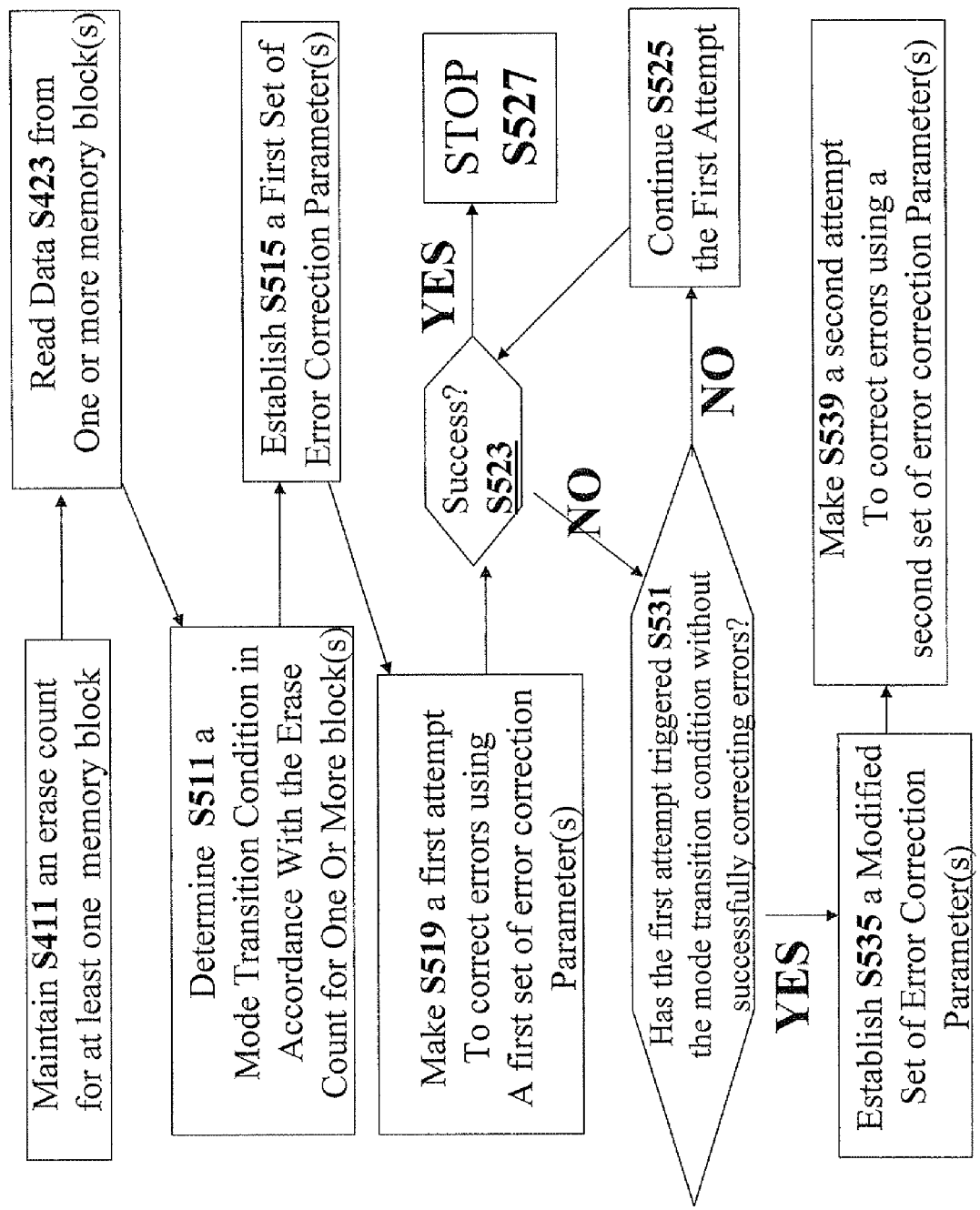
FIG. 4A is a flow chart of a routine for error correction where a mode transition triggering condition is determined according to an erase count for one or more memory blocks.
Figure 4B:
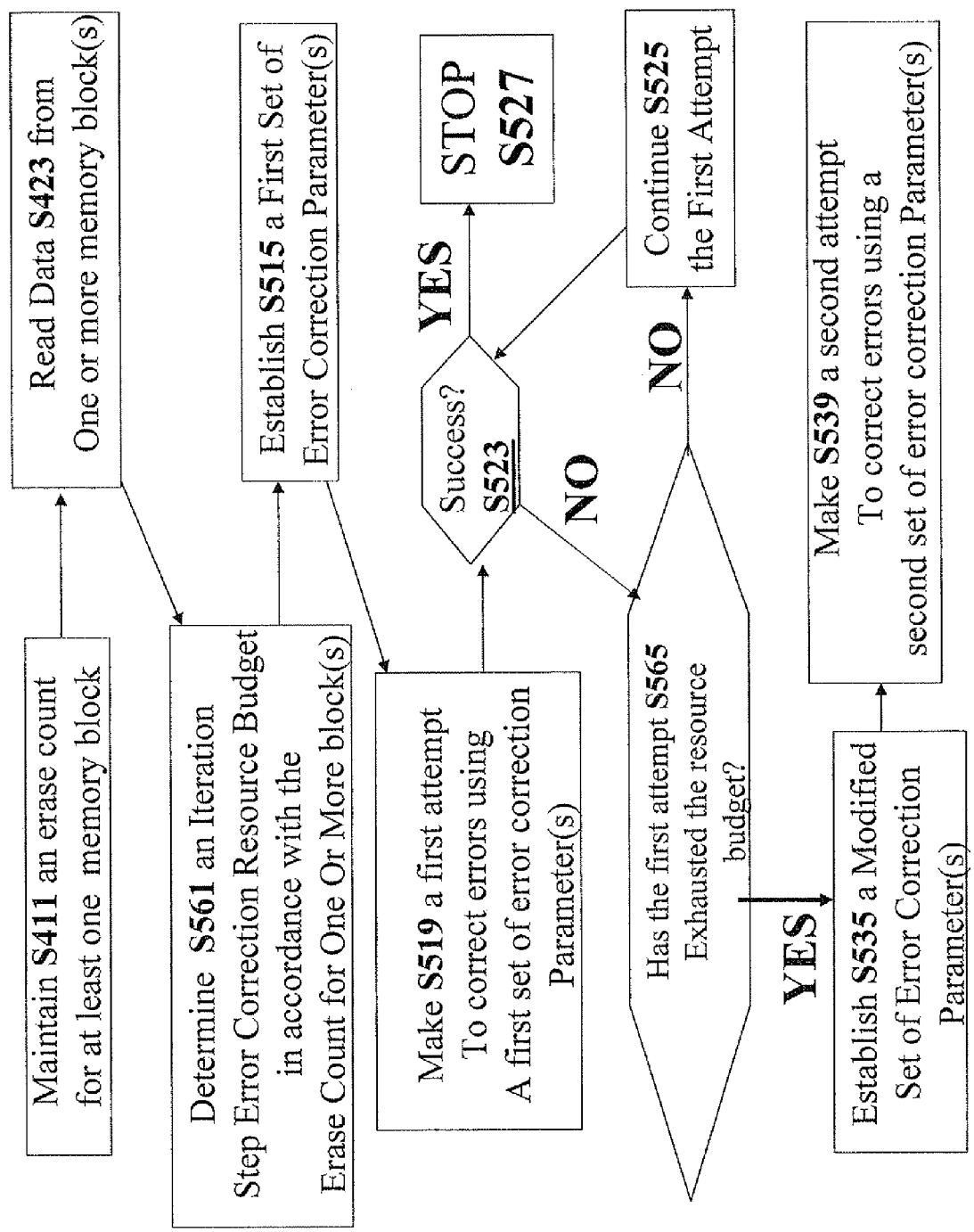
FIG. 4B is a flow chart of a routine for error correction where a resource budget for an error correction attempt is determined according to an erase count for one or more memory blocks.

A Discussion of FIGS. 4A-4B

FIGS. 4A-4B are block diagrams of techniques where (i) a first attempt to correct errors is made (in step S519); (ii) at some point, if the first attempt does not succeed in correcting errors, the first attempt is aborted and a second attempt (in step S539) to correct errors is made. FIGS. 4A-4B relate to establishing and enforcing a policy for determining when the first attempt is considered a failure and aborted. This decision is not trivial—in the event that the first attempt to correct errors (in step S519) is "prematurely" considered a failure, this may result in an error-correction process that is unnecessarily slow and/or resource-consuming, because one or more "extra/unnecessary" attempts to correct errors are made when the first attempt would have succeeded/sufficed if allowed to run its course. On the other hand, in the event that a transition to a second attempt is unnecessarily delayed and "too much"

time/resources is spent carrying out the first attempt, this may also result in an error-correction process that is unnecessarily slow and/or resource-consuming.

In FIG. 4A-4B, it is disclosed that a policy for determining when the first attempt is considered a failure (and thus aborted) may be established and enforced in accordance with the erase count(s) of the memory block(s) from which data to be error-corrected is read.

In FIGS. 4A-4B, the first attempt is made in step S519 using a "first set" of error correction parameter(s) established in step S515 and the second attempt is made in step S539 using a "second set" of error correction parameter(s) established in step S535. In both FIG. 4A and FIG. 4B, in the event that the first attempt is successful as determined in step S523, there is no need (see step S527) to make an additional attempt in step S539.

FIG. 4A relates to criteria for deciding when to "transition" from the first attempt to correct errors in step S519 (thereby aborting the first attempt) to the second attempt to correct errors in step S539.

In the event that the erase count of the memory block(s) is "low," then an optimistic approach may be adopted according to the assumption that there is a relatively "high" chance that the first attempt will succeed. Thus, in this case, the "mode transition condition" determined in step S511 may be one which is relatively "generous" to initial error correction attempts that are relatively "fast" or "light weight" (how "fast" or "slow" or "heavy-weight" or "light-weight" an attempt is may be established at least in part in step S515 and/or step S535). Conversely, in the event that the erase count is "high," then a pessimistic approach may be adopted, and the "mode transition condition" determined in step S511 may be one which is "more stingy" to initial error correction attempts that are relatively "fast" or "light weight," since it is assumed that there is a high likelihood that these initial attempts will fail anyhow.

The "mode transition condition" is a condition where it is determined that the first attempt has failed and that a transition to a different "mode" is warranted, in order to make a "second" or "different" attempt to correct errors. As illustrated in FIG. 4A, if the mode transition condition is triggered in step S531, a new attempt is made to correct errors in steps S535 and S539, if the condition is not triggered at any given time during the first attempt, the first attempt continues in step S525.

In one example, the "transition condition" relates to a "timeout condition"—i.e. in step S531 it is determined how much time the first attempt of steps S519 and S534 is allowed to "run" without "aborting" the attempt and beginning a "new attempt" with different error correction parameters. In another example, the first attempt itself employs an iterative routine, and the "transition condition" relates to a "number of iterations condition"—i.e. how many steps of the "employed iterative routine" are allowed to run without successfully correcting errors before this "employed iterative routine" is considered a failure and aborted in favor a "new" or second attempt. In yet another example, the "transition condition" relates to a number of CPU cycles which may be "consumed" or used by the first attempt before aborting this first attempt.

The teachings of FIGS. 4A (and 4B) are applicable to any "iterative routine" where a "first attempt" is made in step S519 and then, if the first attempt is "not successful," a "second attempt" is later made.

Figure 6A:
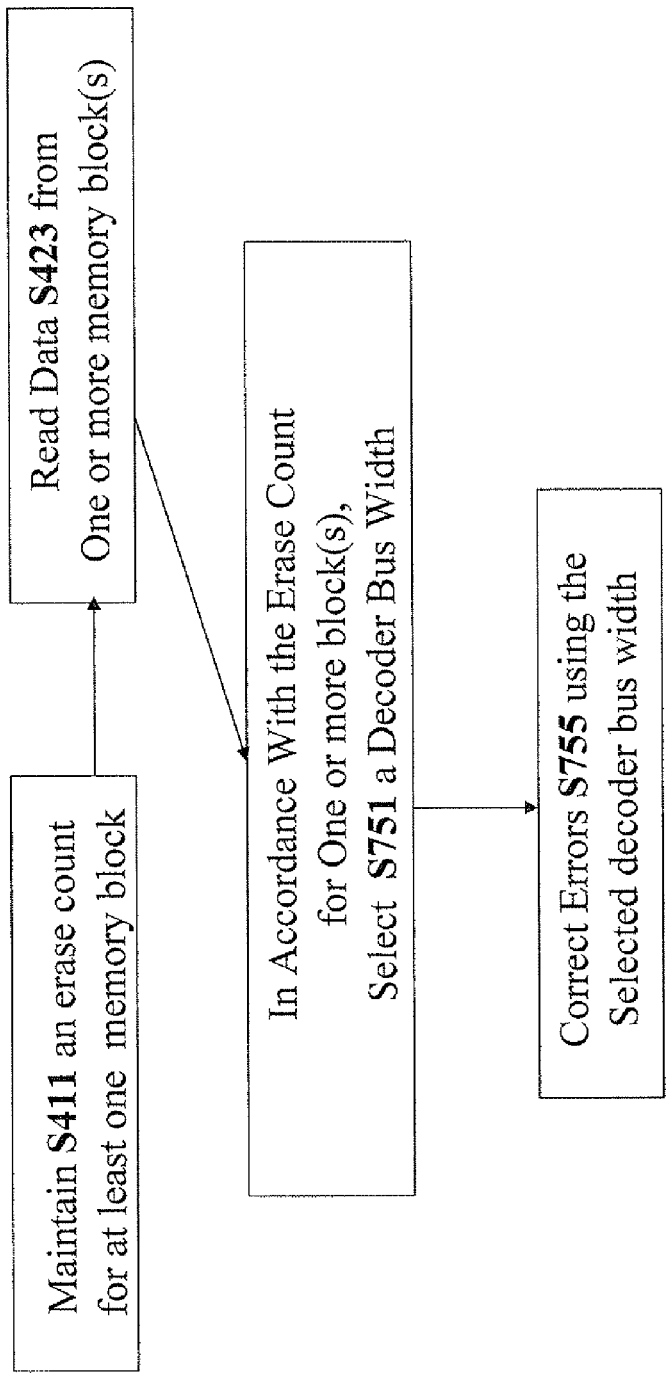
FIG. 6A-6B are flow charts of routines for error correction where a decoder bus width is determined according to an erase count for one or more memory blocks.
Figure 6B:
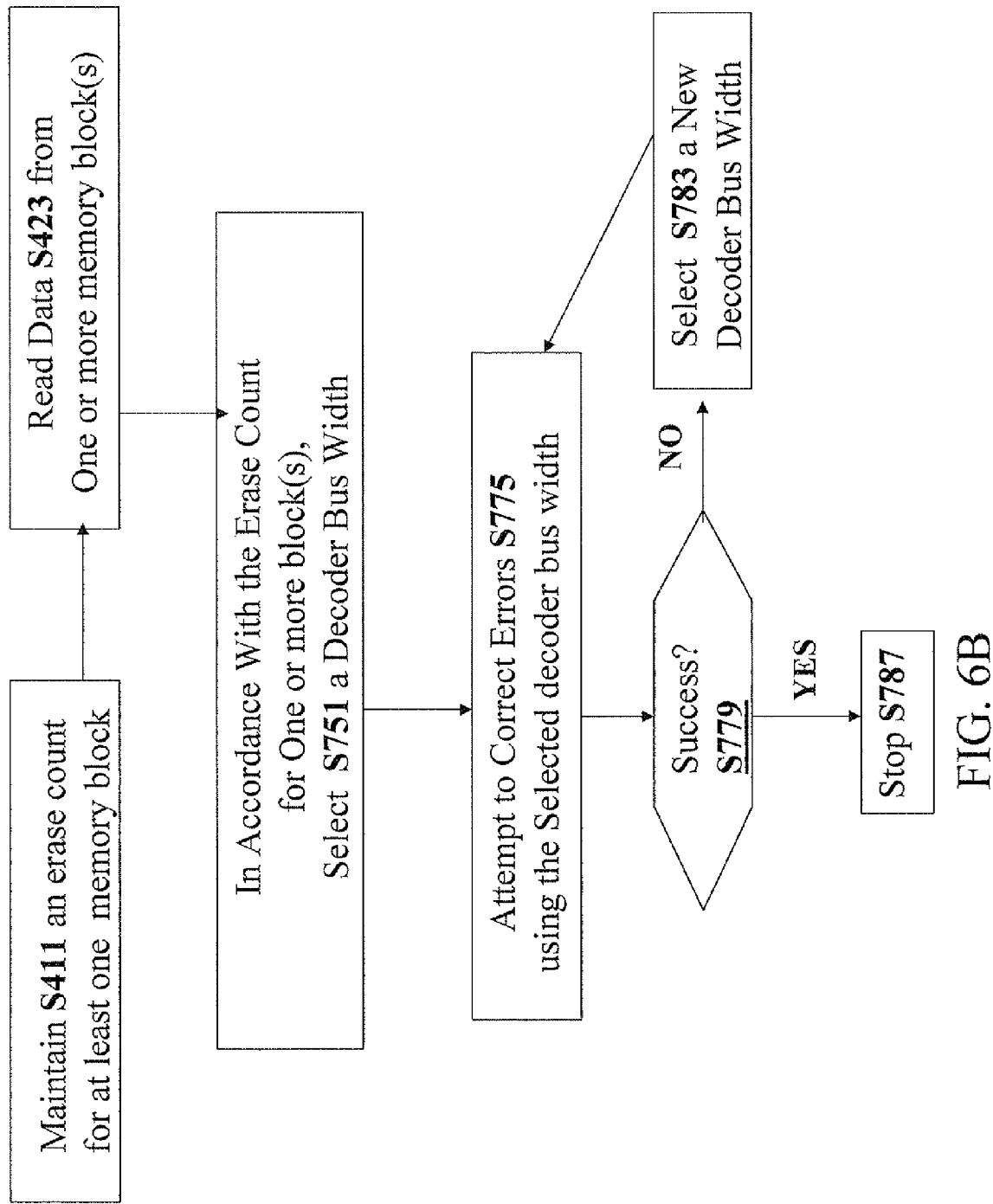

Thus, in different examples, the "mode transition" refers (i) moving from a lighter mode to a heavier mode of a given decoder, or (ii) moving from a first "mode" where a first decoder selected from a plurality of decoders is used to a second "mode" where a second decoder selected from the plurality of decoders is used or (iii) for a soft-decoder moving from a first mode associated with a first set of bit-probability values to a second mode associated with a second set of bit-probability values, or (iv) moving from a first mode where a first number (i.e. non-negative integer) of soft bits is used to a second mode where a second number of soft bits is used and (v) moving from a first mode with a first decoder bus width to a second mode with a second decoder bus width (see FIG. 6B).

It is appreciated that this list provided is illustrative and not an exhaustive list.

In FIG. 43, the first attempt is provided with a "budget" in accordance with erase count(s) of a memory block from which the data (i.e. for which error correction is attempted) is read. This budget may be a time budget or a number of CPU cycles budget or a number of iterations budget or any other type of "resource" budget which may be "consumed" by the first attempt. In another example, this budget may be a maximum amount of volatile memory which is allowed to be allocated for storing 'intermediate results' used in the first attempt.

In the event that the erase count is relatively "low," a "larger" budget may be allocated in step S561; in the event that the erase count is relatively "high," a "smaller" budget may be allocated. In step S561, this iteration step error correction resource budget is determined, and in step S565 a determination is made if this resource budget has been exhausted. If the budget has been exhausted, a new attempt is made to correct errors in steps S535 and S539; if, during the first attempt, the budget has not yet been exhausted, the first attempt to correct errors continues in step S525.

Figure 5A:
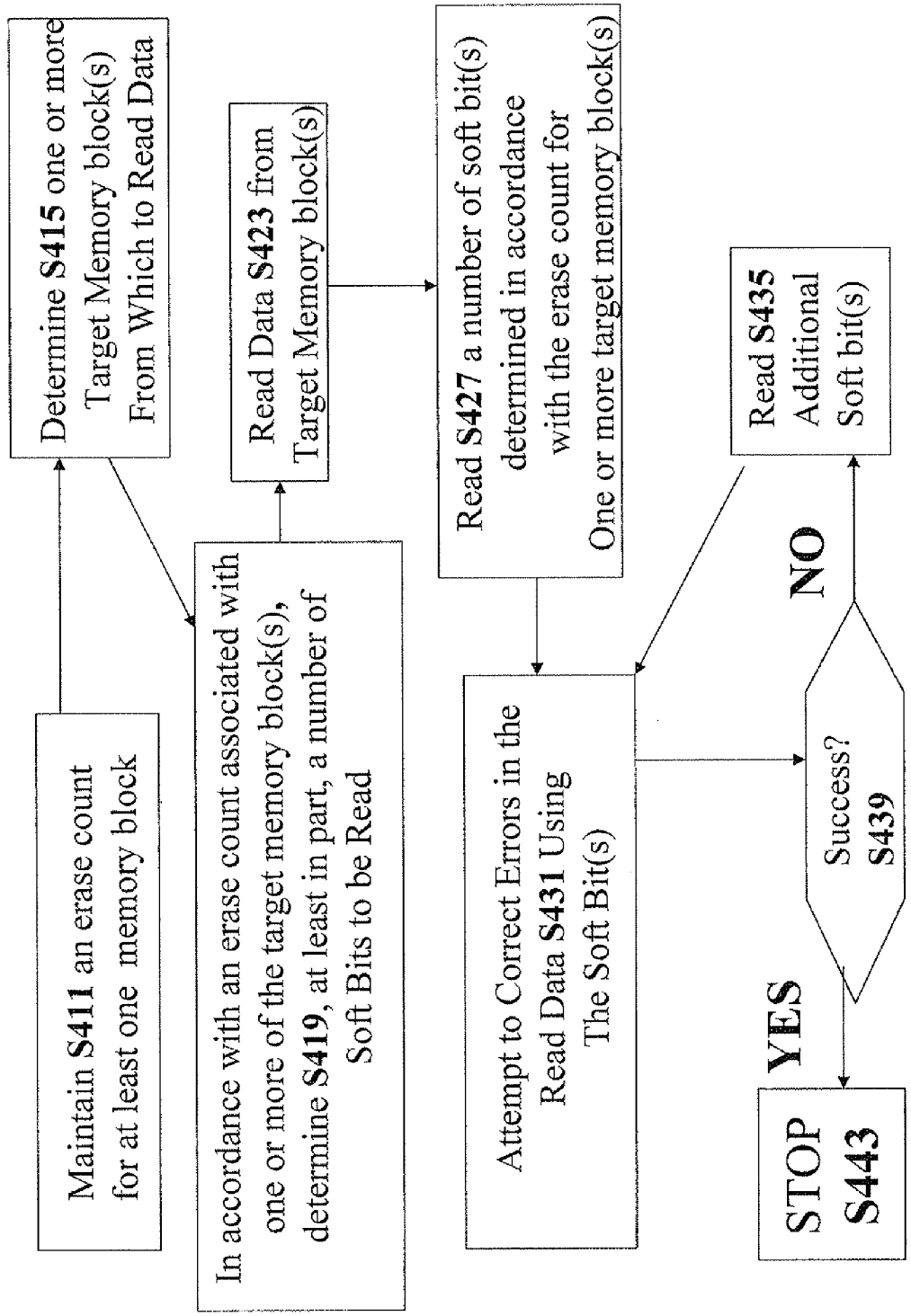
FIG. 5A-5B are flow charts of routines where a number of soft bits to be read for an error correction attempt is determined according to an erase count for one or more memory blocks.
Figure 5B:
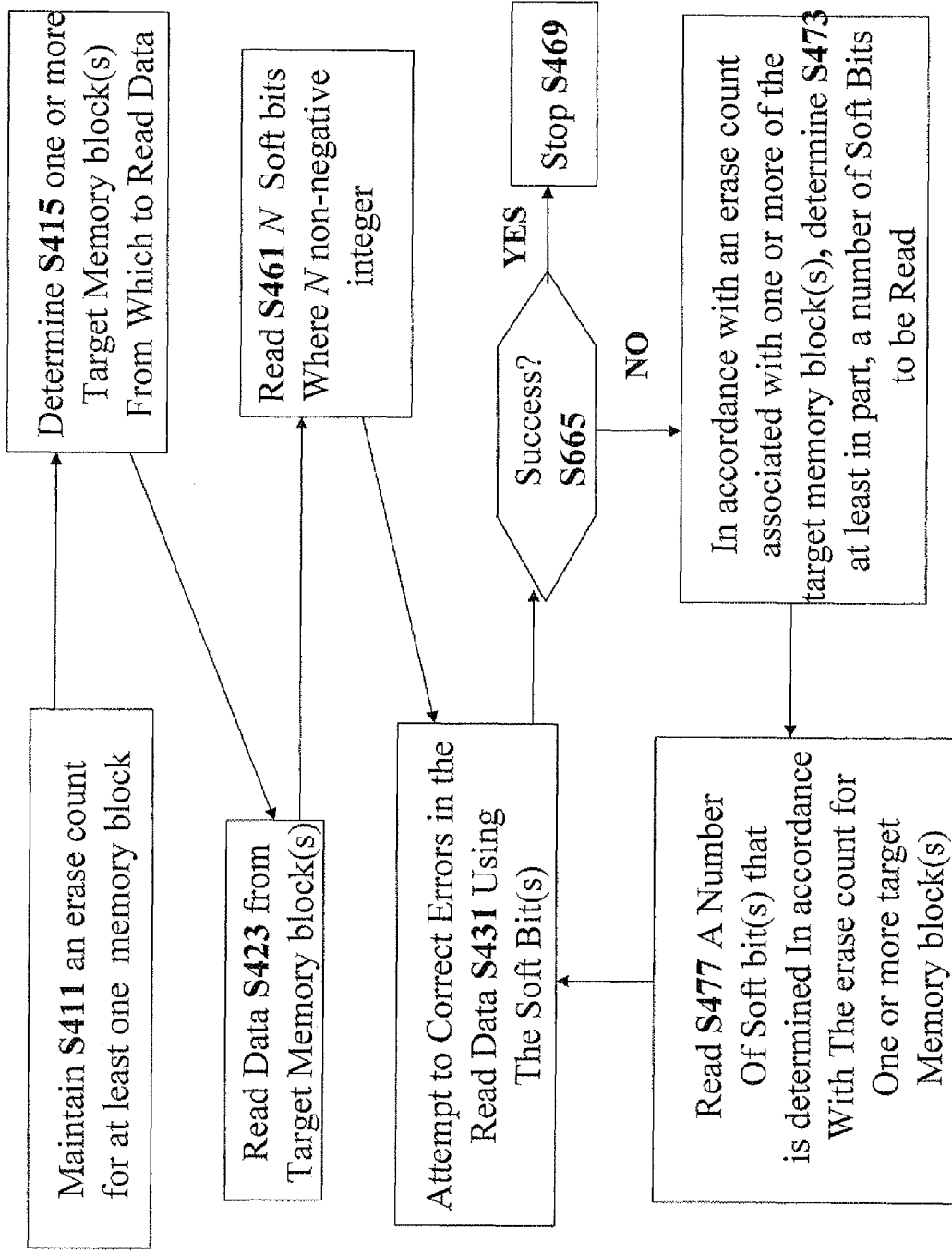

A Discussion of FIGS. 5A-5B

FIGS. 5A-5B relate to a technique for determining a number of soft bits to be read for correcting errors (see also the discussion above that refers to FIGS. 5A-5B). In step S419 of FIG. 5A, a number of soft bits to be read for an initial attempt to correct errors is determined. This number of soft bits is determined according to an erase count associated with one or more target memory block(s) (determined in step S415) from which data to be error corrected is read (in step S423).

In step S427, the determined number of soft bits is read, and in step S431, an attempt is made to correct errors in the data (i.e. read in step S423) using the soft bits. In the event that the attempt is successful (see step S439), there is no need (see step S443) to continue the error-correction process. If the attempt does not succeed, one or more additional soft bit(s) may be read in step S435.

It is noted that the order of the steps in FIG. 5A (and for all figures provided with the present disclosure) is not limiting—for example, the data reading from the target block(s) of solid state memory in step S423 may be carried out before the determining of step S419.

Reference is now made to FIG. 5B. In optional step S461, some number of soft bits N are read, where N is a non-negative integer (if N is zero, then step S461 is skipped and the first attempt to correct errors in step S431 does not employ soft bits). In step S431, an attempt to correct errors is made (using soft bits if soft bits are available). If this attempt succeeds (see step S665), there is no need (see step S469) to continue the error-correction process. If this attempt does not succeed, a determining of how many soft bits will read (i.e. for use in a subsequent attempt to correct errors) is made in step S473—this number is determined according to an erase count associated with one or more target memory block(s) of step S415 and S423.

In step S477, the number of soft bits (i.e. determined in step S473) is read—these soft bits are used in step S431.

A Discussion of FIG. 6A

FIG. 6 is a flow chart of a technique for correcting errors in accordance with an erase count of a block(s) of memory from which data is read.

Soft decoders operate by assigning a probability to each bit of the codeword (e.g. the probability that the value of the bit is 1 and not 0), and running multiple iterations in each of which the probability of each bit is changed according to the current probabilities of other bits.

Any decoder that is not a soft decoder is herein called "an algebraic decoder".

This type of calculation is said to employ "message passing" techniques, as each bit "passes messages" to its peers. A major design decision in implementing such decoders is the bus width of the message passing. Using a wide bus (for example 10 bits) assures that if the algorithm can cope with the errors, the algorithm will indeed converge to the correct data. But on the other hand, the power consumption of the decoder is high in such design. Using a narrow bus (for example 3 bits) provides much lower power consumption, but the decoder might fail to converge to the correct data in cases with relatively large number of errors (even if the same pattern of data and errors is correctly decoded in a corresponding wide bus decoder). The number of bits used for message passing has a major influence on the power consumption of the decoding process—the higher the number of bits, the higher the power consumption.

One of the reasons for this phenomenon is that the soft decoder's messages and channel inputs (soft values) are stored in a large-power-consuming RAM during the decoding operation. When for example we use 3 bits instead of 10 bits per message, 70% of the RAM can be shut down. Another source of power consumption saving is the processing units that process these passing messages. It is evident that performing computations on 3 bits instead of 10 bits requires smaller and less-power-consuming units.

It is possible to implement a soft decoder in which the number of bits in the "message passing" can be set at the beginning of the decoding. Thus, in some embodiments, a decoding bus width size is selected in accordance with erase count of the block(s) from where data is read. In the event that erase count is "low" indicating an "optimistic situation," it is possible to select a smaller decoding bus width size and to correct errors accordingly. Otherwise, it may be preferable to select a larger decoding bus width size.

This is shown graphically in FIG. 6A. In step S751, a decoder bus width is selected in accordance with the erase count of the block(s) from where data is read. In step S755, errors are corrected according to the selected value of the decoder bus width.

A Discussion of FIG. 6B

In FIG. 6B, steps S411, S423 and S751 are the same as in FIG. 6A.

In step S775, an attempt is made to correct errors using the selected decoder bus width which is selected in step S751. If this attempt succeeds (see step S779) there is no need (see step S787) to continue the error-correction process. Otherwise, if this attempt does not succeed (see step S783) a new decoder bus width is selected, and a new attempt to correct errors is made.

Additional Discussion

It is noted that any technique disclosed herein may be implemented on the "device side" or on the "host side." In one particular example, any step or combination of steps disclosed herein (including but not limited to the steps of maintaining the erase count, reading data or soft bits, correcting errors, making an attempt to correct errors, selecting a decoder or mode or number of soft bits, determining whether or not to employ a given decoder or decoder mode, selecting a decoder bus width, determining or enforcing a transition condition or resource budget, etc.) may be carried out by device controller 280 of a flash device 260 (or any other data storage device including a solid state memory) for example, a device controller of a peripheral storage device 260*.

In some embodiments, after errors are corrected in data on the "device side," the error-corrected data may be sent from the storage device 260* to a host device 310 via respective inter-device interfaces. This (along with the data reading of step S423 and any error correcting) may be carried out in response to a request, sent by the host 310 to the peripheral storage device 260* to read data stored within the solid state non-volatile memory (for example, flash memory 270).

Device controller 280 may include any software and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in controller 280 including but not limited to reduced instruction set computer (RISC) architecture and/or complex instruction set computer (CISC) architecture.

Any disclosed technique may be implemented in any combination of hardware, computer-readable code modules executed by hardware, and firmware.

Embodiments of the present invention provide apparatus or computer medium for implementing any disclosed technique.

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method for handling error correction, the method comprising
   a) maintaining an erase count for at least one block of a solid state memory;
   b) reading data from one of the memory blocks having an associated erase count;
   c) establishing and enforcing a policy based on the erase count, wherein the policy identifies transition conditions and error correction parameters used for correcting errors in the read data;

d) in accordance with the associated erase count of the memory block, effecting at least one of:
   i) choosing one of a first decoder and a second decoder; and
   ii) choosing one of a first decoder mode and a second decoder mode,
wherein effecting at least one of the decoder and the decoder mode is based on transition conditions and error correction parameters of the policy; and
e) correcting errors in the read data using only the chosen decoder or the chosen decoder mode,
wherein the error correction parameters are selected from a group consisting of,
   (i) selection parameter for selecting the first decoder or the second decoder; and
   (ii) a decoder mode parameter for selecting the first decoder mode or the second decoder mode of the selected decoder.

2. The method of claim 1 wherein the solid state memory is a flash memory.

3. The method of claim 1 wherein at least one of the maintaining, the reading, the effecting, and the correcting is carried out by a device controller of a storage device in which the solid state memory resides.

4. The method of claim 3 wherein the storage device is operatively coupled to a host device via an inter-device interface, and wherein the method further comprises:
e) sending the error-corrected data from the storage device to the host device.

5. A method for handling error correction, the method comprising
a) maintaining an erase count for at least one block of a solid state memory;
b) reading data from one of the memory blocks having an associated erase count;
c) establishing and enforcing a policy based on the erase count, wherein the policy identifies transition conditions and error correction parameters for correcting errors in the read data;
d) in accordance with the associated erase count, effecting at least one of:
   i) deciding whether to:
      A) attempt to correct errors using a lighter-weight decoder or
      B) attempt to correct errors using only a heavier-weight decoder that is heavier than the lighter-weight decoder;
   ii) deciding whether to:
      A) attempt to correct errors using a faster decoder or
      B) attempt to correct errors using only a slower decoder that is slower than the faster decoder;
   iii) deciding whether to:
      A) attempt to correct errors using a lighter-weight mode of a particular decoder or
      B) attempt to correct errors using only a heavier-weight mode of the particular decoder that is heavier than the lighter weight mode; and
   iv) deciding whether to:
      A) attempt to correct errors using a faster mode of a particular decoder or
      B) attempt to correct errors using only a slower mode of the particular decoder that is slower than the faster mode; and
e) in accordance with at least one of the decisions effecting at least one of the decoder and the decoder mode based on transition conditions and error correction parameters specified in the policy, correcting errors in the read data, wherein the error correction parameters are selected from a group consisting of,
   (i) selection parameter for selecting one of the lighter-weight decoder, the heavier-weight decoder, a faster decoder or a slower decoder; and
   (ii) a decoder mode parameter for selecting one of the lighter-weight decoder mode, the heavier-weight decoder mode, faster decoder mode or the slower decoder mode of the selected decoder.

6. The method of claim 5 wherein at least one of the maintaining, the reading, one or more of the decisions, and the correcting is carried out by a device controller of a storage device in which the solid state memory resides.

7. A method for handling error correction, the method comprising:
a) maintaining an erase count for at least one block of a solid state memory;
b) reading data from one of the memory blocks having an associated erase count;
c) in accordance with the associated erase count, determining at least one of:
   i) a mode transition condition; and
   ii) an error correction attempt resource budget;
d) making a first attempt to correct errors in the read data using a first set of error correction parameters; and
e) in the event that the first attempt to correct errors is unsuccessful, making a second attempt to correct errors in the read data using a second set of error correction parameters, the second attempt being contingent upon at least one of:
   i) a triggering of the mode transition condition by the first attempt; and
   ii) an exhausting of the resource budget by the first attempt, wherein the second set of error correction parameters are different from the first set of error correction parameters and the error correction parameters for the first and the second set are selected from the group consisting of:
      i) a selection parameter for selecting a decoder from a plurality of decoders;
      ii) a decoder mode parameter for selecting a decoder mode for a given decoder from a plurality of decoder modes.

8. The method of claim 7 wherein:
i) the method includes determining the mode transition condition; and
ii) the second attempt is contingent upon at least the triggering of the mode transition condition by the first attempt.

9. The method of claim 7 wherein:
i) the method includes determining the resource budget; and
ii) the second attempt is contingent upon at least the exhausting of the resource budget by the first attempt.

10. The method of claim 7 wherein at least one of the maintaining, the reading, the determining, and one or more of the attempts is carried out by a device controller of a storage device in which the solid state memory resides.

11. A method for handling error correction, the method comprising:
a) maintaining an erase count for at least one block of a solid state memory;
b) reading data from one of the memory blocks having an associated erase count;

c) in accordance with the associated erase count, determining at least one of:
   i) a mode transition condition; and
   ii) an error correction attempt resource budget;
d) making a first attempt to correct errors in the read data using a first set of error correction parameters; and
e) in the event that the first attempt to correct errors is unsuccessful, making a second attempt to correct errors in the read data using a second set of error correction parameters, the second attempt being contingent upon at least one of:
   i) a triggering of the mode transition condition by the first attempt; and
   ii) an exhausting of the resource budget by the first attempt,
wherein the mode transition condition is selected from the group consisting of:
   i) a timeout condition;
   ii) a number of iterations condition; and
   iii) a number of CPU cycles condition.

12. A method for handling error correction, the method comprising:
   a) maintaining an erase count for at least one block of a solid state memory;
   b) reading data from one of the memory blocks having an associated erase count;
   c) in accordance with the associated erase count, determining at least one of:
      i) a mode transition condition; and
      ii) an error correction attempt resource budget;
   d) making a first attempt to correct errors in the read data using a first set of error correction parameters; and
   e) in the event that the first attempt to correct errors is unsuccessful, making a second attempt to correct errors in the read data using a second set of error correction parameters, the second attempt being contingent upon at least one of:
      i) a triggering of the mode transition condition by the first attempt; and
      ii) an exhausting of the resource budget by the first attempt,
   wherein the error correction attempt resource budget is selected from the group consisting of:
      i) a time budget;
      ii) a CPU cycles budget; and
      iii) an iterations budget.

13. A method for handling error correction, the method comprising:
   a) maintaining an erase count for at least one block of a solid state memory;
   b) reading data from one of the memory blocks having an associated erase count;
   c) in accordance with the associated erase count, determining at least one of:
      i) a mode transition condition; and
      ii) an error correction attempt resource budget;
   d) making a first attempt to correct errors in the read data using a first set of error correction parameters; and
   e) in the event that the first attempt to correct errors is unsuccessful, making a second attempt to correct errors in the read data using a second set of error correction parameters, the second attempt being contingent upon at least one of:
      i) a triggering of the mode transition condition by the first attempt; and
      ii) an exhausting of the resource budget by the first attempt,
   wherein at least one error correction parameter is selected from the group consisting of:
      i) a selection parameter for selecting a decoder from a plurality of decoders;
      ii) a decoder mode parameter for selecting a decoder mode for a given decoder from a plurality of decoder modes;
      iii) a bit-probability value for the read data;
      iv) a number of soft bits; and
      v) a decoder bus width.

14. A data storage device comprising:
a) a solid-state memory; and
b) a controller operative to:
   i) maintain an erase count for at least one block of the solid-state memory;
   ii) read data from one of the memory blocks having an associated erase count;
   iii) establish and enforce a policy based on the erase count, wherein the policy identifies transition conditions and error correction parameters for correcting errors in the read data;
   iv in accordance with the associated erase count, effect at least one of:
      A) deciding whether to:
         I) attempt to correct errors using a lighter-weight decoder or
         II) attempt to correct errors using only a heavier-weight decoder that is heavier than the lighter weight decoder;
      B) deciding whether to:
         I) attempt to correct errors using a faster decoder or
         II) attempt to correct errors using only a slower decoder that is slower than the faster decoder;
      C) deciding whether to:
         I) attempt to correct errors using a lighter-weight mode of a particular decoder or
         II) attempt to correct errors using only a heavier-weight mode of the particular decoder that is heavier than the lighter weight mode; and
      D) deciding whether to:
         I) attempt to correct errors using a faster mode of a particular decoder or
         II) attempt to correct errors using only a slower mode of the particular decoder that is slower than the faster mode;
   iv) in accordance with at least one of the decisions effecting at least one of the decoder and the decoder mode based on transition conditions and error correction parameters specified in the policy, correct errors in the read data,
wherein the error correction parameters are selected from a group consisting of,
   (i) selection parameter for selecting one of the lighter-weight decoder, the heavier-weight decoder, a faster decoder or a slower decoder; and
   (ii) a decoder mode parameter for selecting one of the lighter-weight decoder mode, the heavier-weight decoder mode, faster decoder mode or the slower decoder mode of the selected decoder.

15. A data storage device comprising:
a) a solid state memory; and
b) a device controller operative to:
   i) maintain an erase count for at least one block of the solid state memory;
   ii) read data from one of the memory blocks having an associated erase count;

iii) in accordance with the associated erase count, determine at least one of:
   A) a mode transition condition; and
   B) an error correction attempt resource budget;
iv) make a first attempt to correct errors in the read data using a first set of error correction parameters; and
v) in the event that the first attempt to correct errors is unsuccessful, make a second attempt to correct errors in the read data using a second set of error correction parameters, the second attempt being contingent upon at least one of:
   A) a triggering of the mode transition condition by the first attempt; and
   B) an exhausting of the resource budget by the first attempt,
wherein the error correction parameters for the first and the second set are selected from the group consisting of:
   i) a selection parameter for selecting a decoder from a plurality of decoders;
   ii) a decoder mode parameter for selecting a decoder mode for a given decoder from a plurality of decoder modes.

\* \* \* \* \*